(12) United States Patent
Saito et al.

(10) Patent No.: US 10,838,286 B2
(45) Date of Patent: Nov. 17, 2020

(54) IMAGE GENERATING UNIT, IMAGE PROJECTING APPARATUS, AND HEAT SINK

(71) Applicants: Yoshito Saito, Kanagawa (JP); Akihisa Mikawa, Kanagawa (JP)

(72) Inventors: Yoshito Saito, Kanagawa (JP); Akihisa Mikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/333,689

(22) PCT Filed: Oct. 20, 2017

(86) PCT No.: PCT/JP2017/038044
§ 371 (c)(1),
(2) Date: Mar. 15, 2019

(87) PCT Pub. No.: WO2018/088176
PCT Pub. Date: May 17, 2018

(65) Prior Publication Data
US 2019/0219908 A1    Jul. 18, 2019

(30) Foreign Application Priority Data

Nov. 11, 2016 (JP) .................................. 2016-220532
Jul. 24, 2017 (JP) .................................. 2017-143044

(51) Int. Cl.
*G03B 21/16* (2006.01)
*G02B 26/08* (2006.01)
(Continued)

(52) U.S. Cl.
CPC ........... *G03B 21/16* (2013.01); *G02B 26/085* (2013.01); *G02B 26/0833* (2013.01);
(Continued)

(58) Field of Classification Search
CPC .... G03B 21/005; G03B 21/008; G03B 21/16; G03B 21/145; G03B 21/2066;
(Continued)

(56) References Cited

U.S. PATENT DOCUMENTS 5,883,742 A    3/1999 Kamata
7,389,519 B2    6/2008 Yamanaka et al.
(Continued)

FOREIGN PATENT DOCUMENTS

JP    H09-080550    3/1997
JP    2001-350196    12/2001
(Continued)

OTHER PUBLICATIONS

International Search Report dated Dec. 18, 2017 in PCT/JP2017/038044 filed on Oct. 20, 2017.

*Primary Examiner* — Sultan Chowdhury
(74) *Attorney, Agent, or Firm* — IPUSA, PLLC

(57) ABSTRACT

An image generating unit includes an image generating part configured to generate an image from illumination light; a driving magnet configured to generate a magnetic field; a driving coil arranged in the magnetic field of the driving magnet; a heat radiating part coupled to the image generating part and configured to radiate heat of the image generating part. The driving magnet and the driving coil move the image generating part and the heat radiating part. The driving coil is placed at the heat radiating part via a substance, thermal conductivity of the substance being lower than thermal conductivity of the heat radiating part.

9 Claims, 17 Drawing Sheets

(51) Int. Cl.
*G03B 21/00* (2006.01)
*G03B 33/16* (2006.01)

(52) U.S. Cl.
CPC ....... *G02B 26/0866* (2013.01); *G03B 21/008* (2013.01); *G03B 33/16* (2013.01)

(58) Field of Classification Search
CPC .. G02B 26/085; G02B 26/101; G02B 26/0833; G02B 26/0866
See application file for complete search history.

(56) References Cited

U.S. PATENT DOCUMENTS

| | | |
|---|---|---|
| 7,639,933 B2 | 12/2009 | Seo et al. |
| 8,167,433 B2 | 5/2012 | He |
| 8,446,672 B2 | 5/2013 | Omi |
| 9,213,223 B2 | 12/2015 | Mashitani |
| 9,253,431 B2 | 2/2016 | Tani et al. |
| 9,354,494 B2 | 5/2016 | Mashitani et al. |
| 9,864,262 B2 | 1/2018 | Fujioka et al. |
| 9,952,486 B2 | 4/2018 | Mikawa et al. |
| 9,961,310 B2 | 5/2018 | Mikawa et al. |
| 2010/0215352 A1* | 8/2010 | Yamamoto ............. G03B 17/00 396/55 |
| 2012/0098117 A1* | 4/2012 | Sato ...................... H01L 23/293 257/707 |
| 2013/0107231 A1* | 5/2013 | Ohsugi .................. G02B 7/003 353/85 |
| 2016/0277716 A1 | 9/2016 | Mikawa et al. |
| 2017/0069448 A1* | 3/2017 | Kainaga ................. H01H 33/56 |
| 2017/0122681 A1* | 5/2017 | Aoyama .................... C22C 9/02 |
| 2017/0244940 A1 | 8/2017 | Mikawa et al. |

FOREIGN PATENT DOCUMENTS

| | | |
|---|---|---|
| JP | 2008-070494 | 3/2008 |
| JP | 2008-225158 | 9/2008 |
| JP | 2008-292647 | 12/2008 |
| JP | 2010-243686 | 10/2010 |
| JP | 2010-268604 | 11/2010 |
| JP | 2011-027821 | 2/2011 |
| JP | 2012-181386 | 9/2012 |
| JP | 2013-117629 | 6/2013 |
| JP | 2016-085363 | 5/2016 |
| JP | 2016-085368 | 5/2016 |
| JP | 2016-102945 | 6/2016 |
| JP | 2016-102946 | 6/2016 |
| WO | WO2016/067519 | 5/2016 |

* cited by examiner

[Fig. 1]
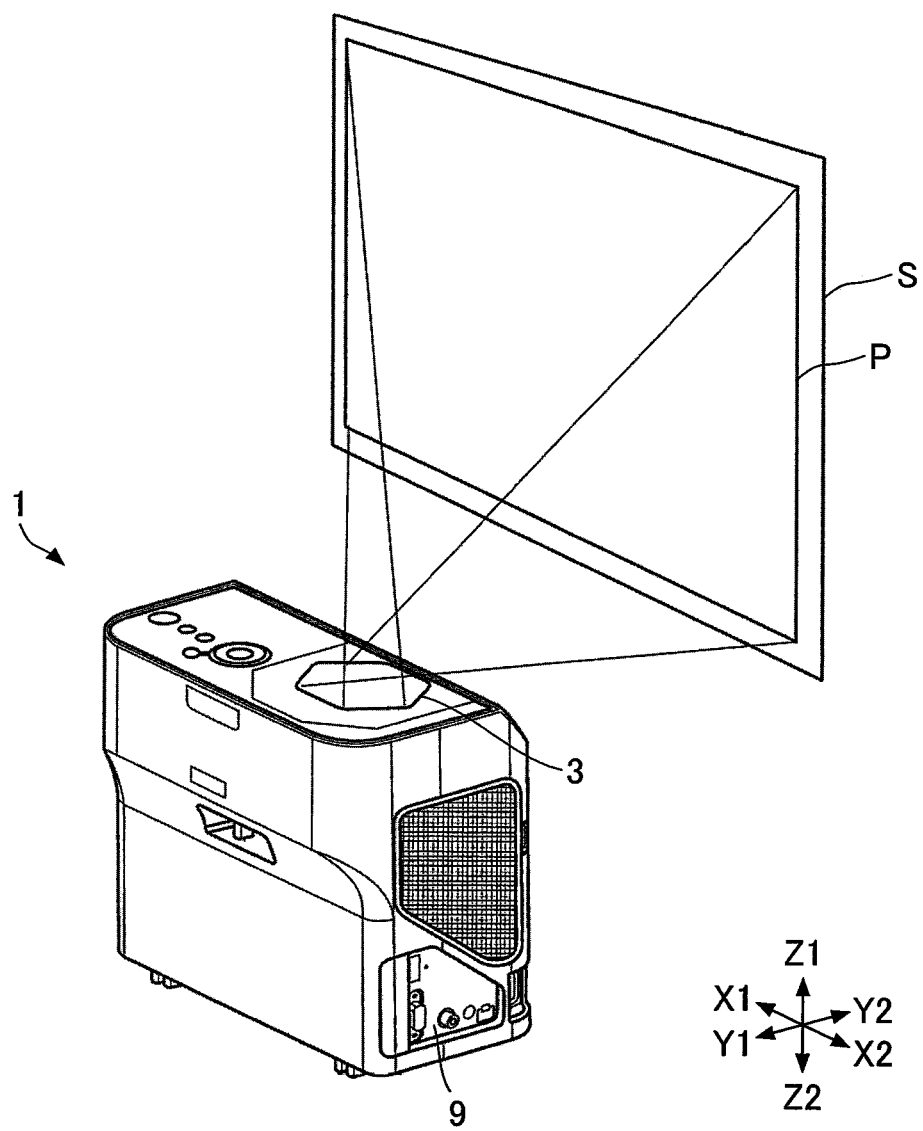

[Fig. 2]
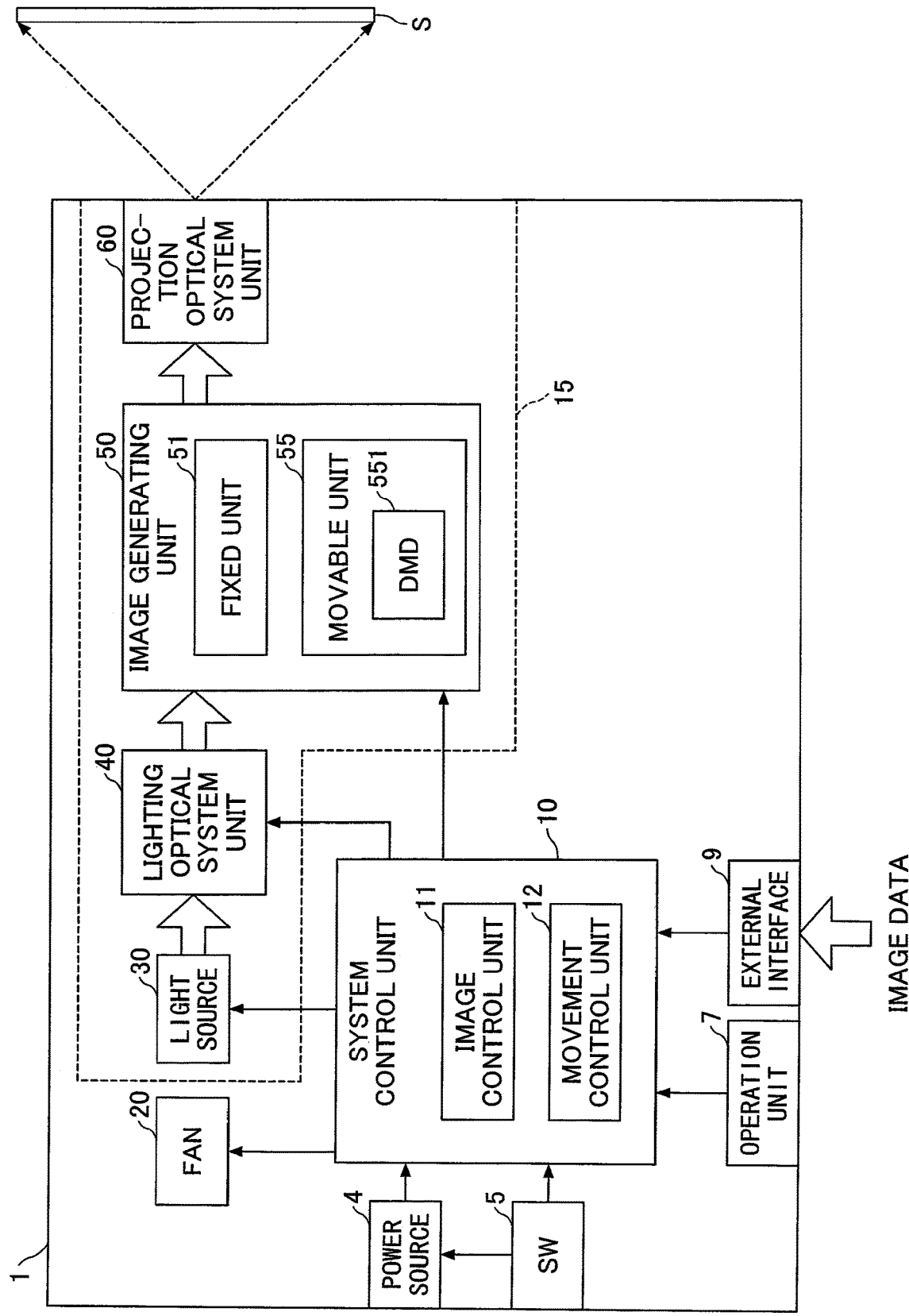

[Fig. 3]
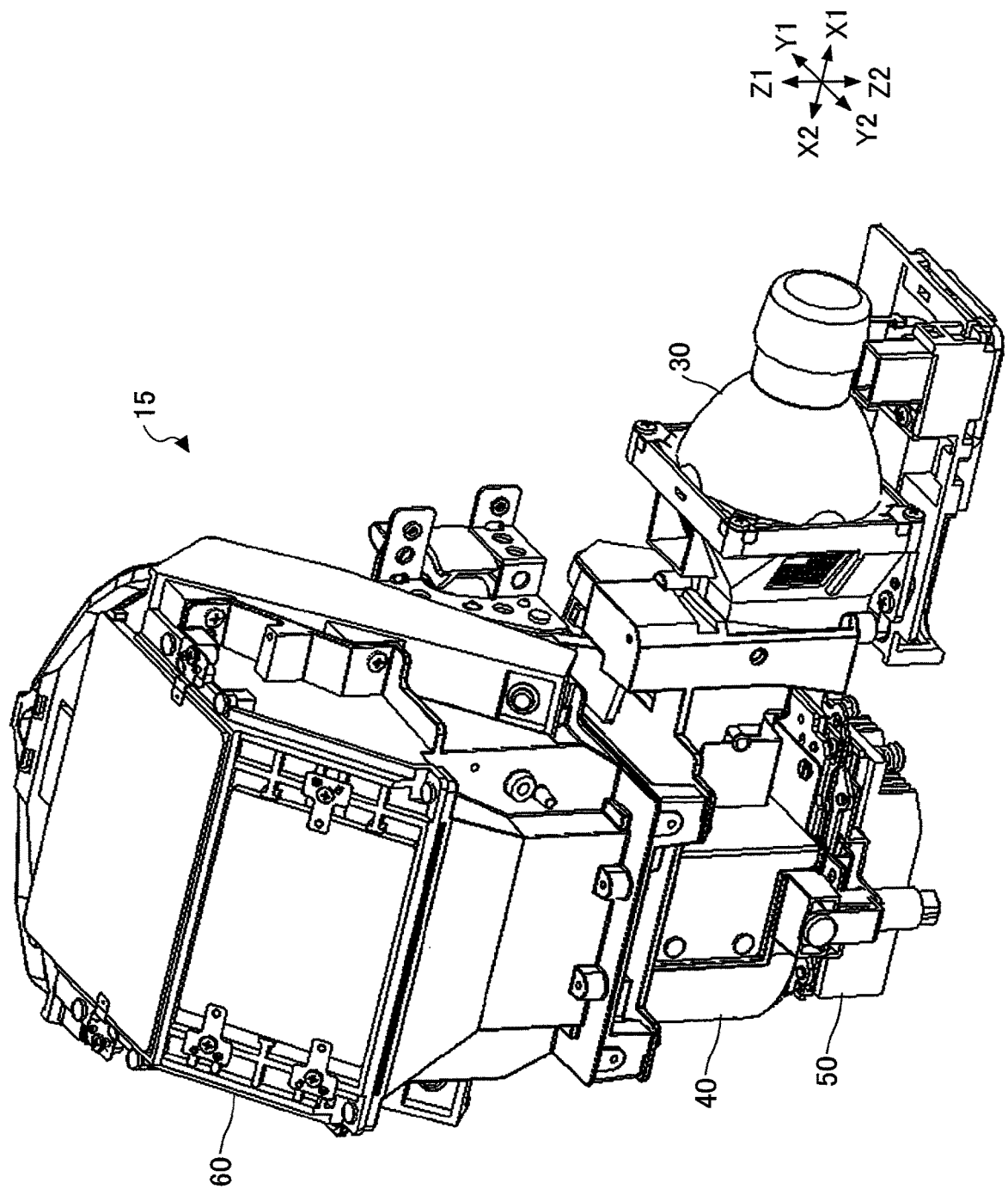

[Fig. 4]
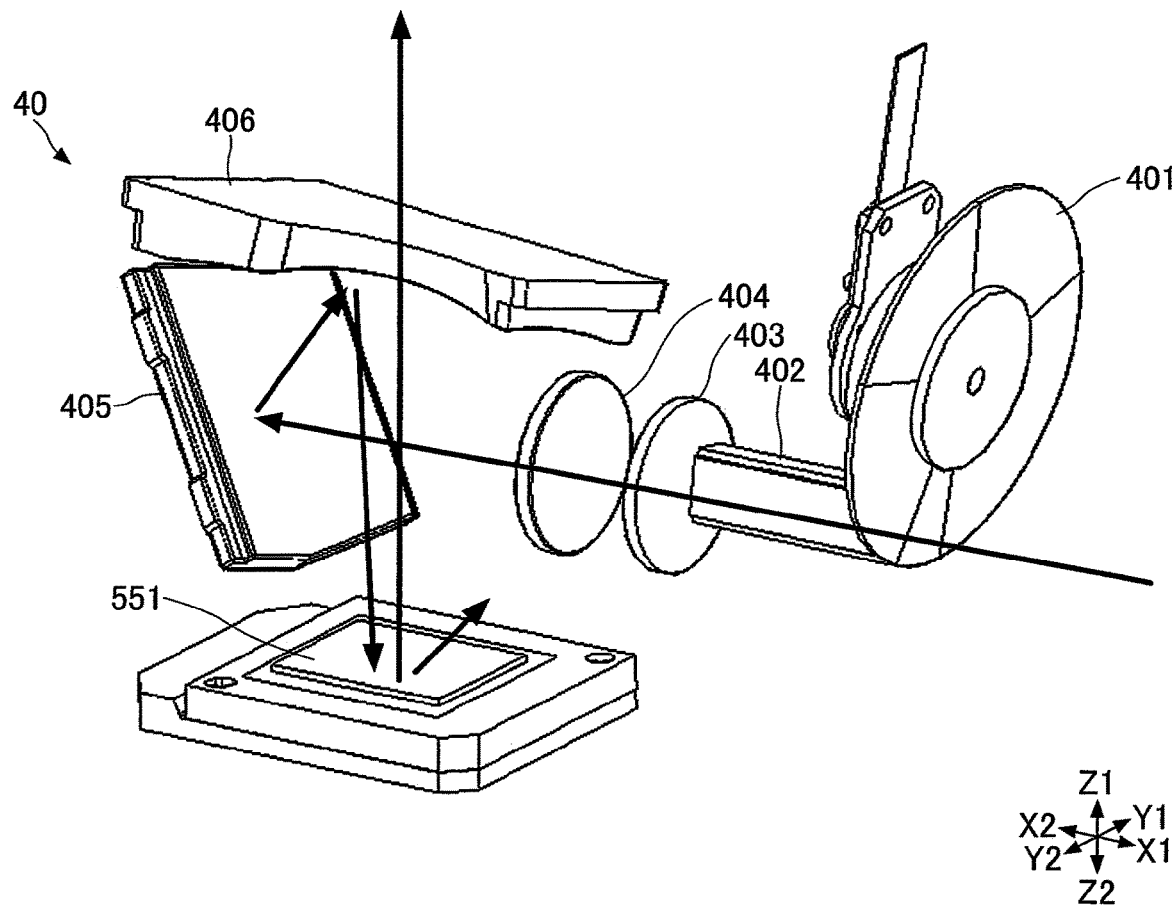

[Fig. 5]
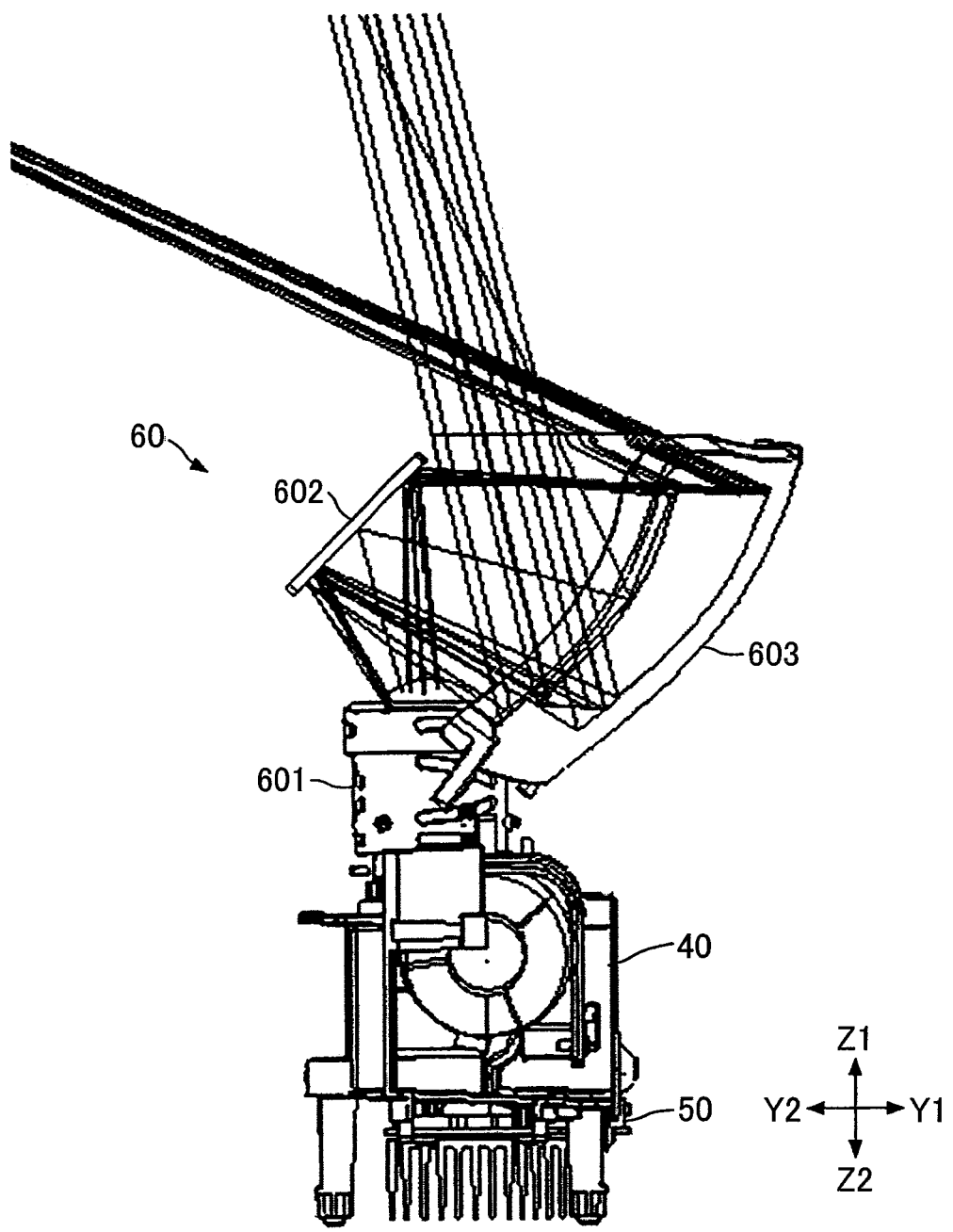

[Fig. 6]
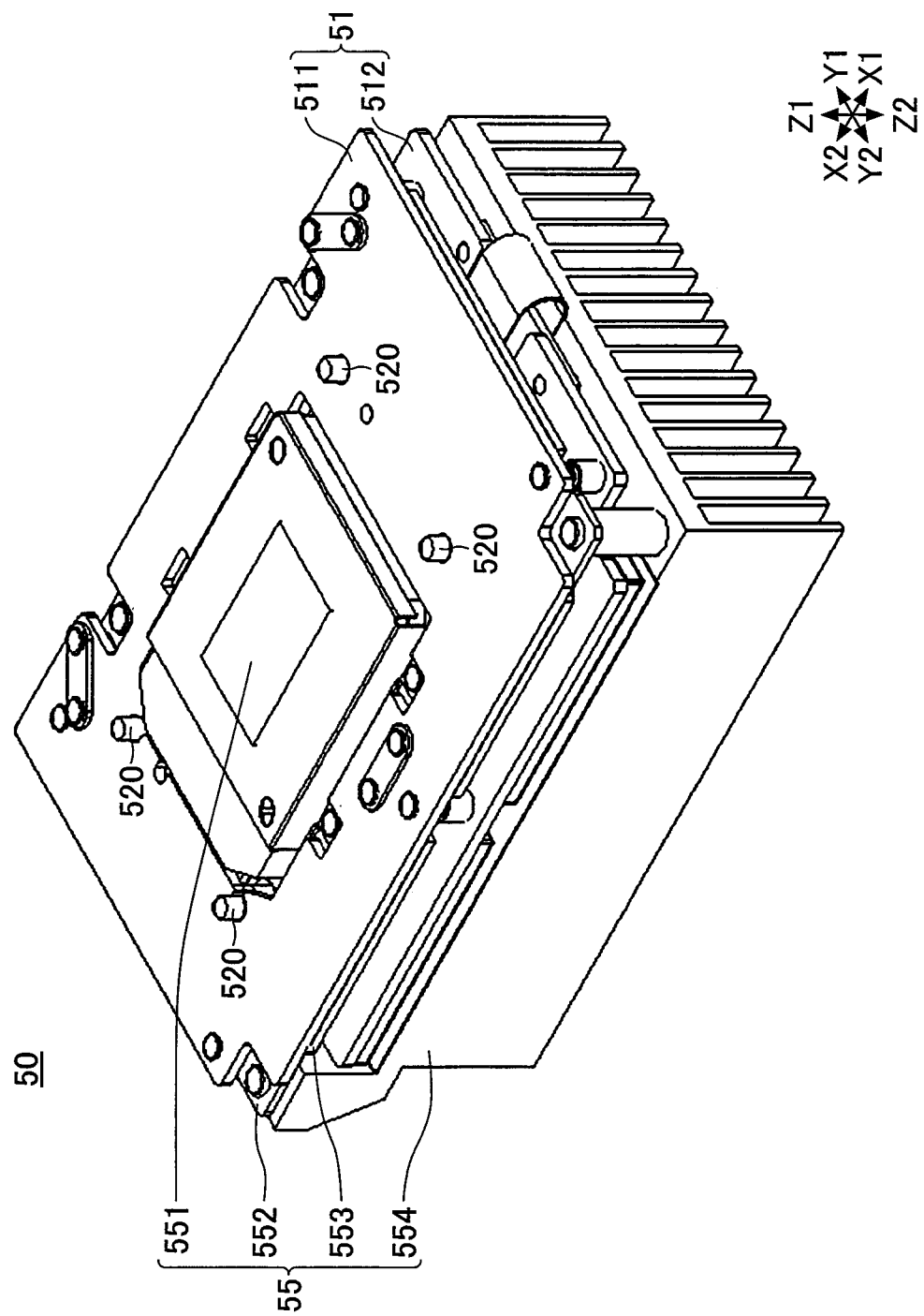

[Fig. 7]
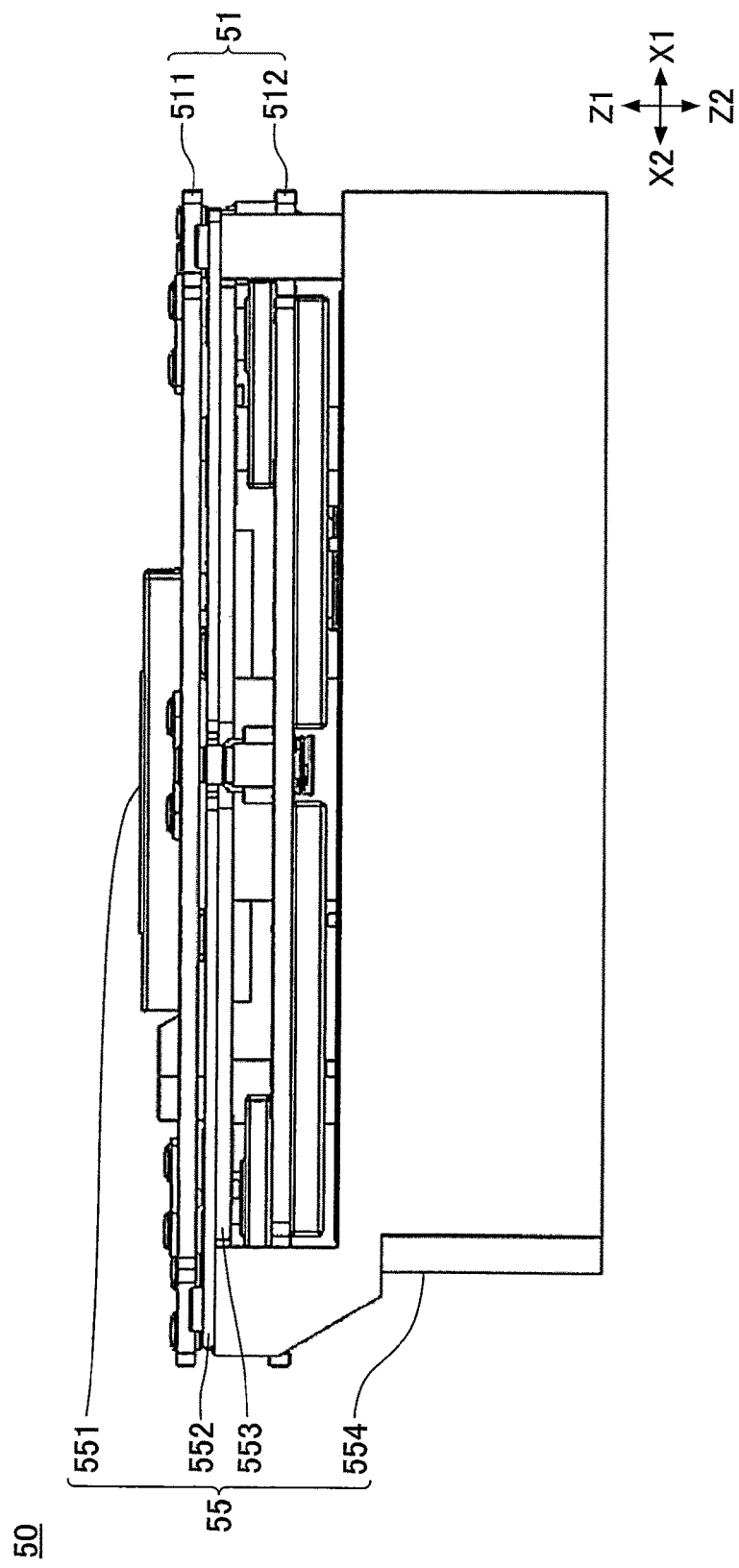

[Fig. 8]
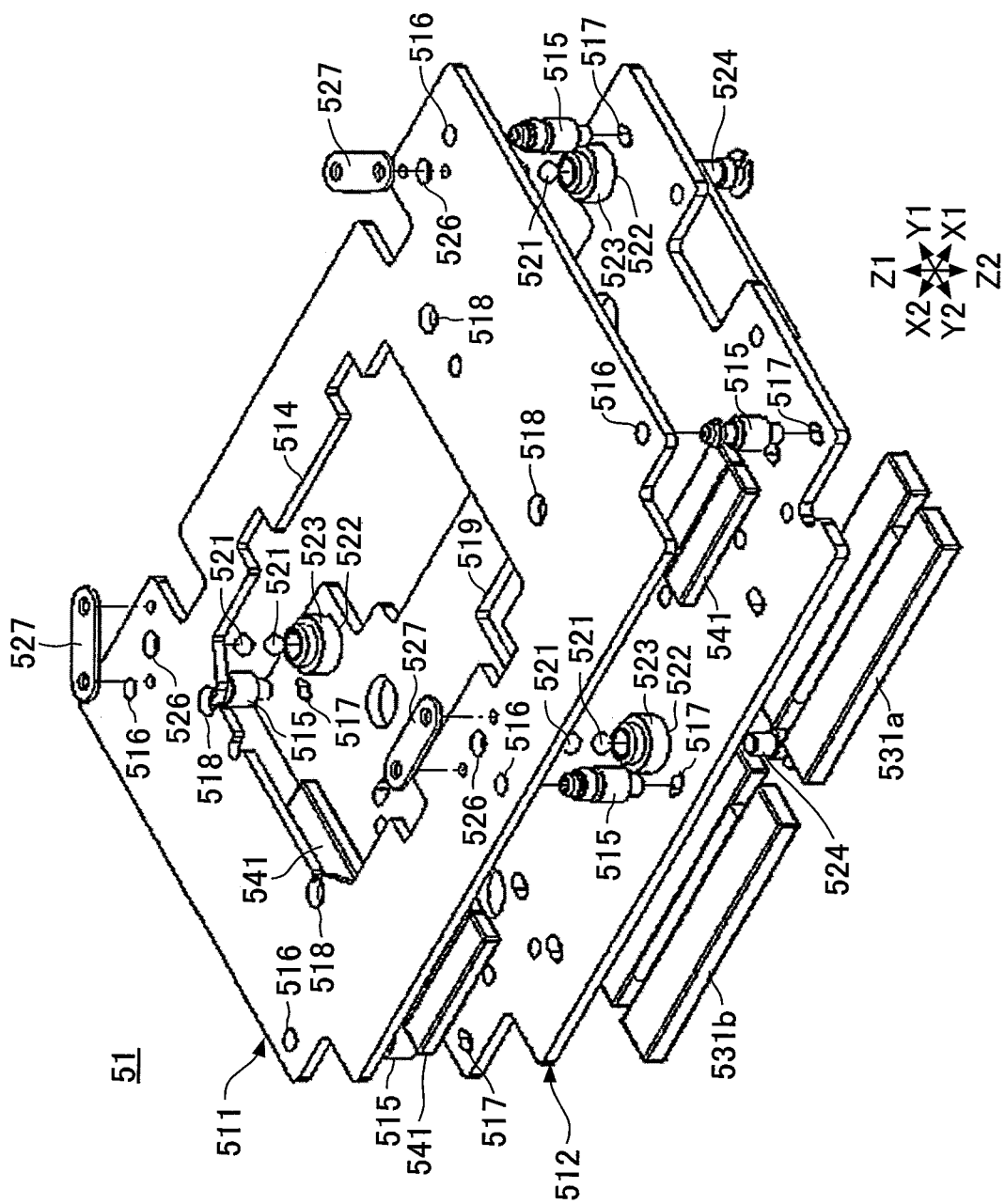

[Fig. 9]
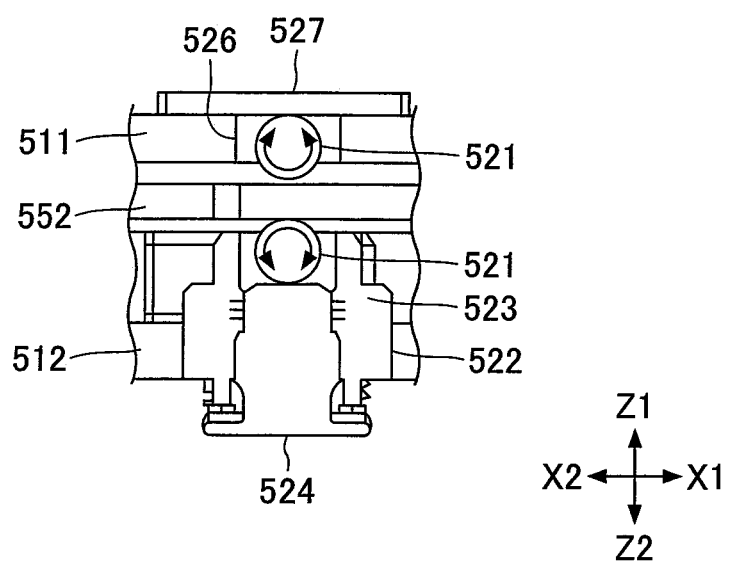

[Fig. 10]
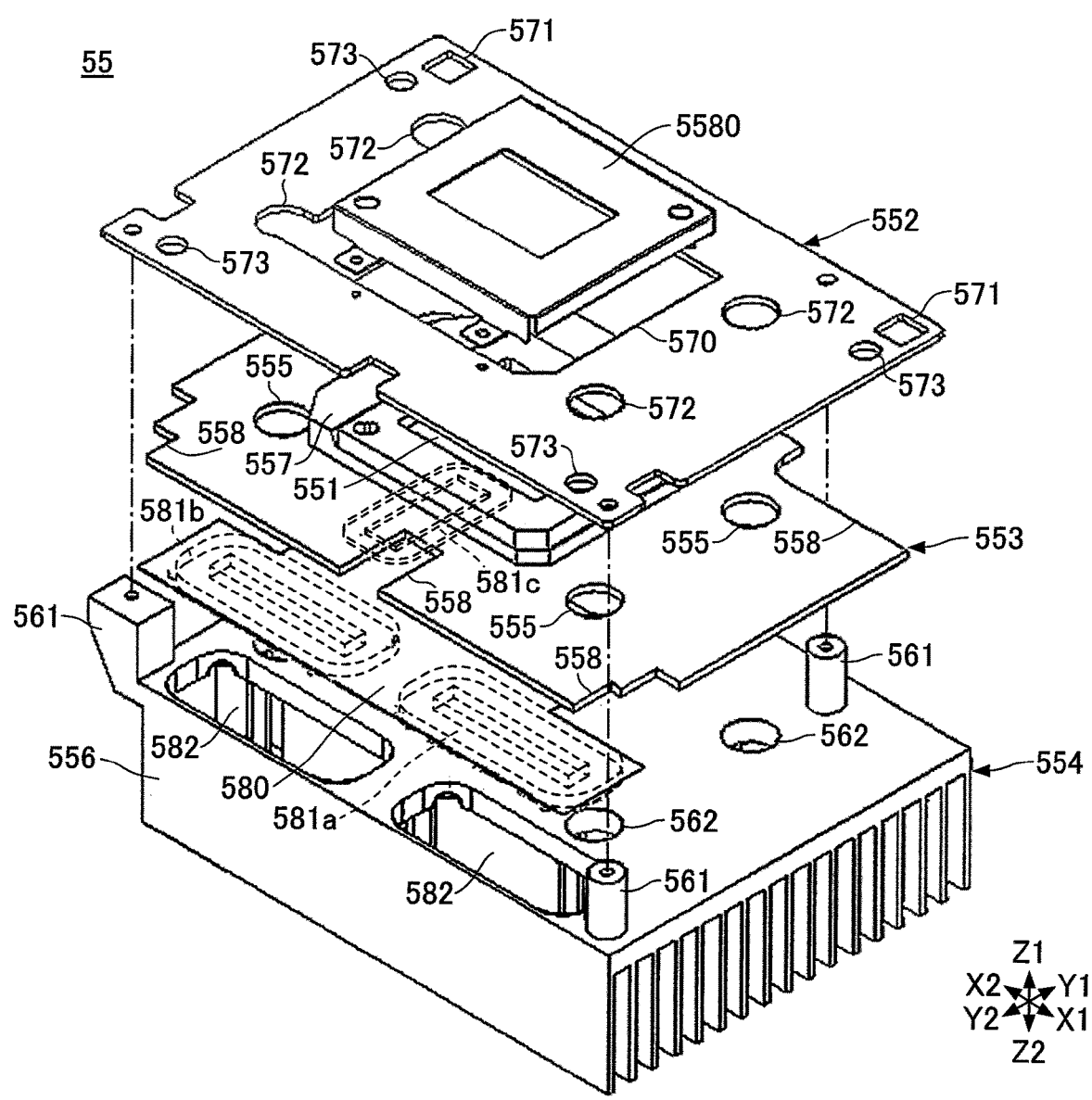

[Fig. 11]
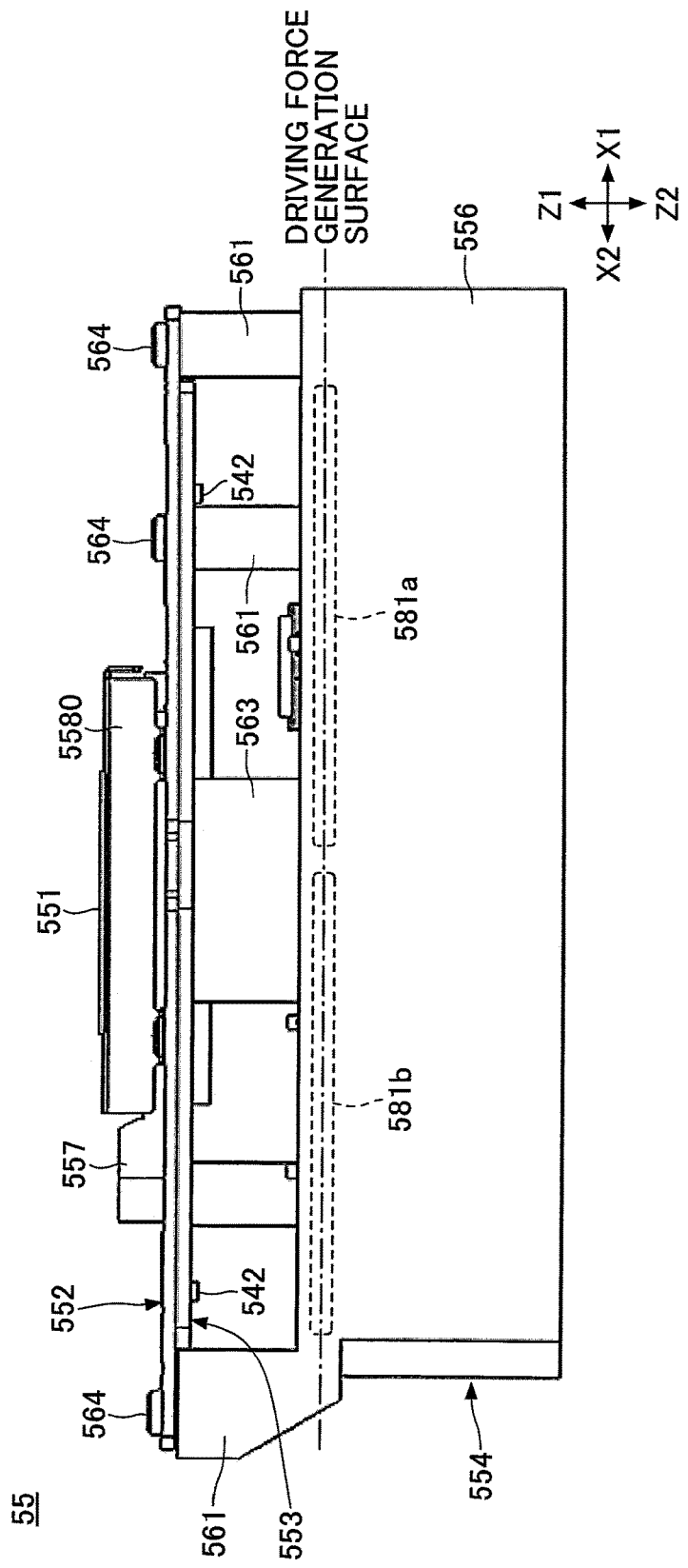

[Fig. 12]
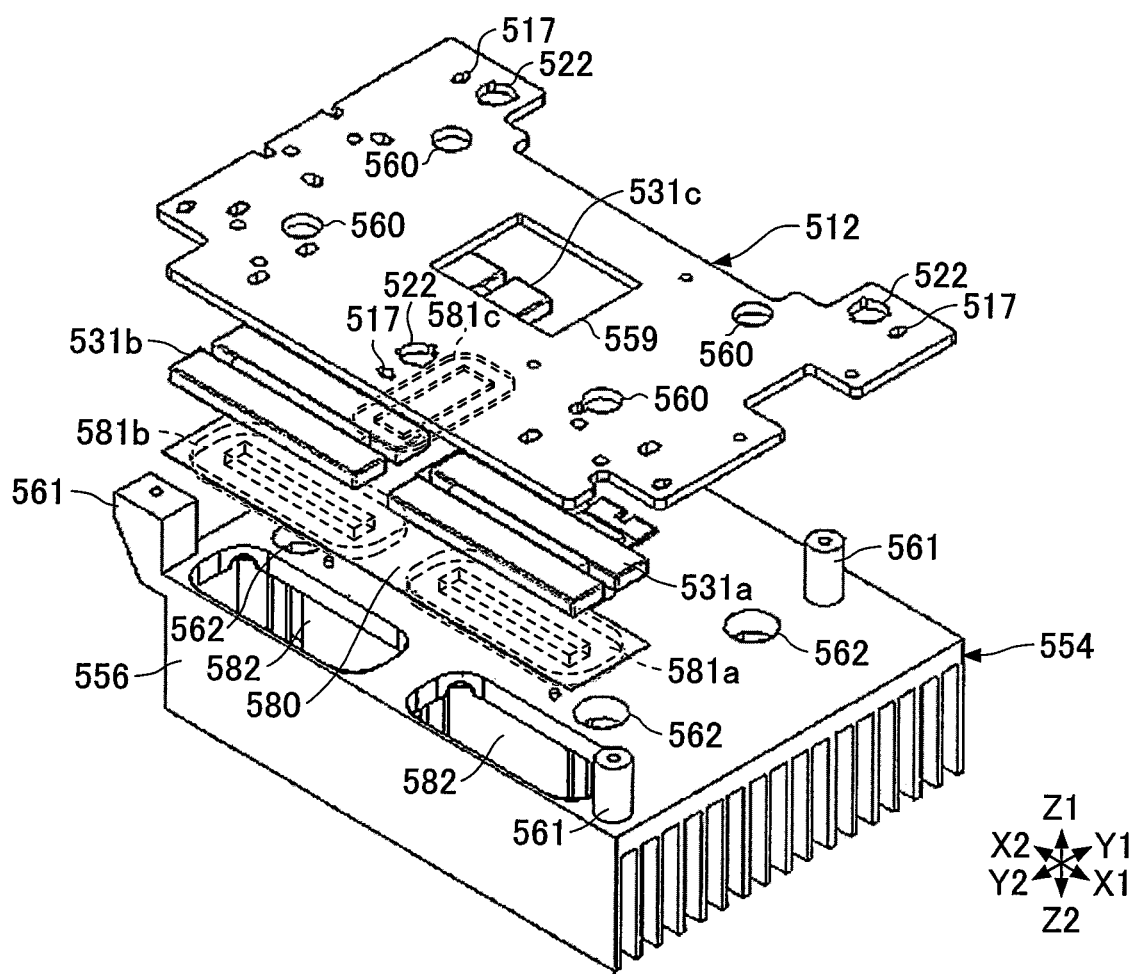

[Fig. 13]
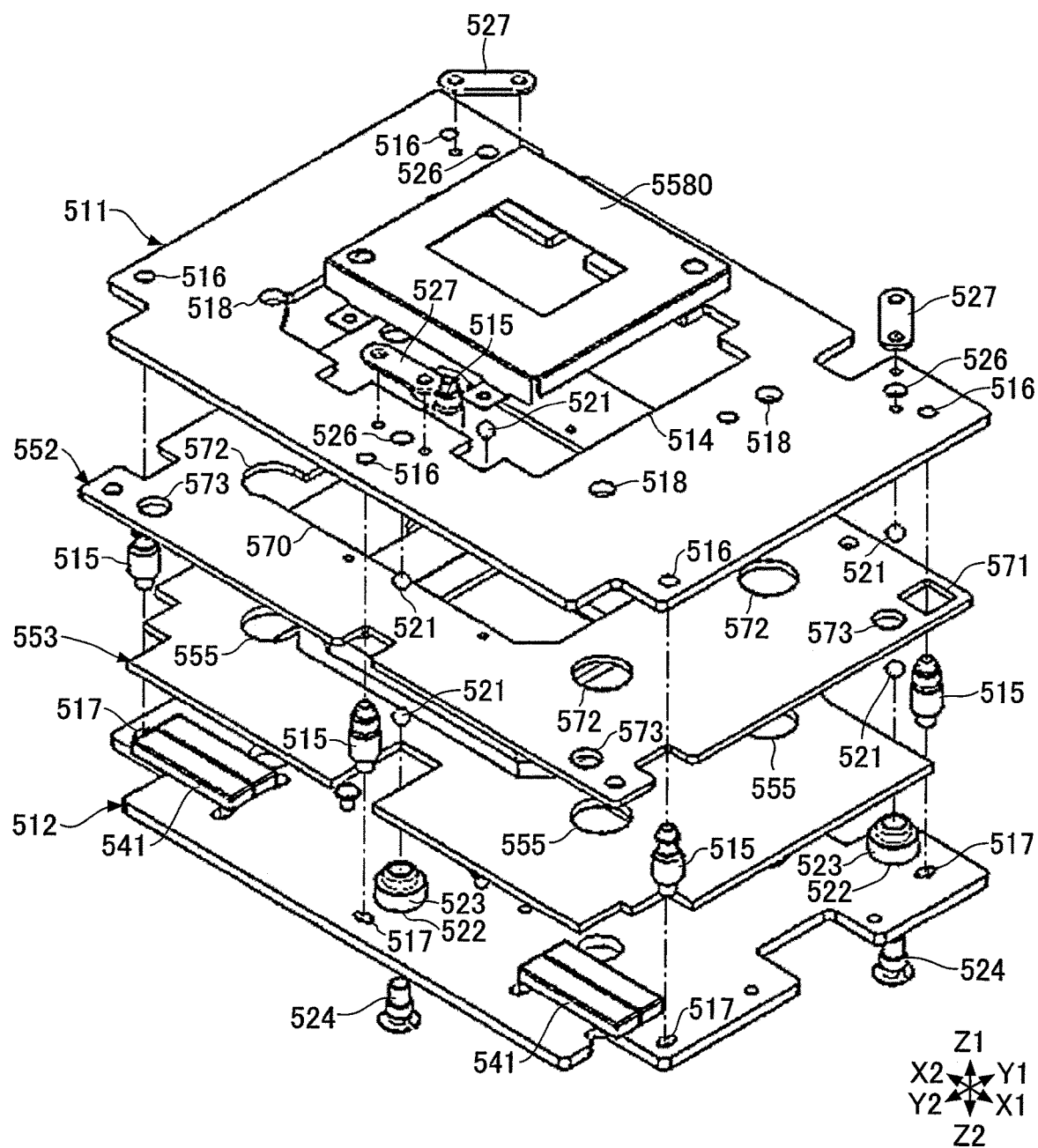

[Fig. 14]
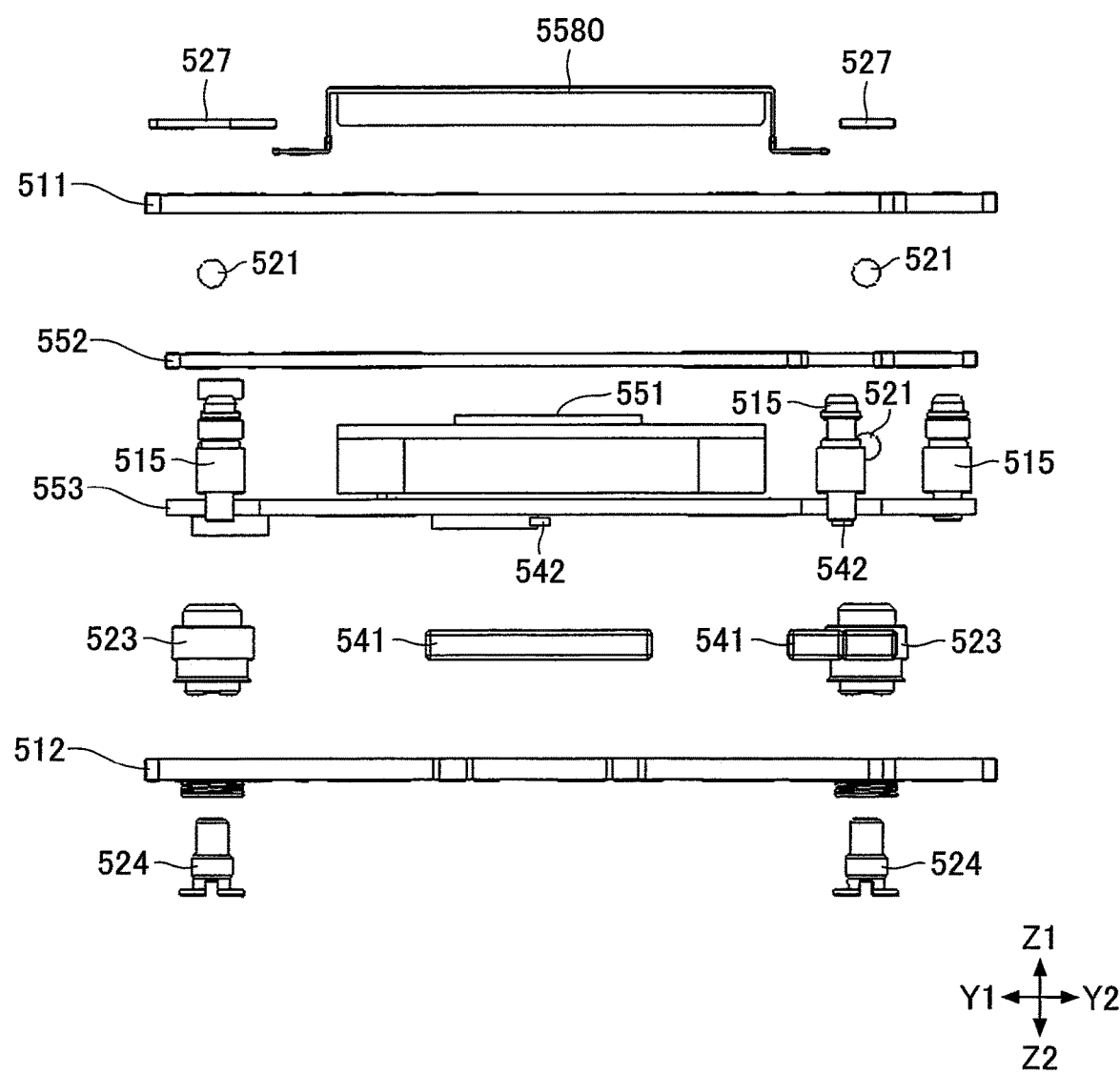

[Fig. 15]
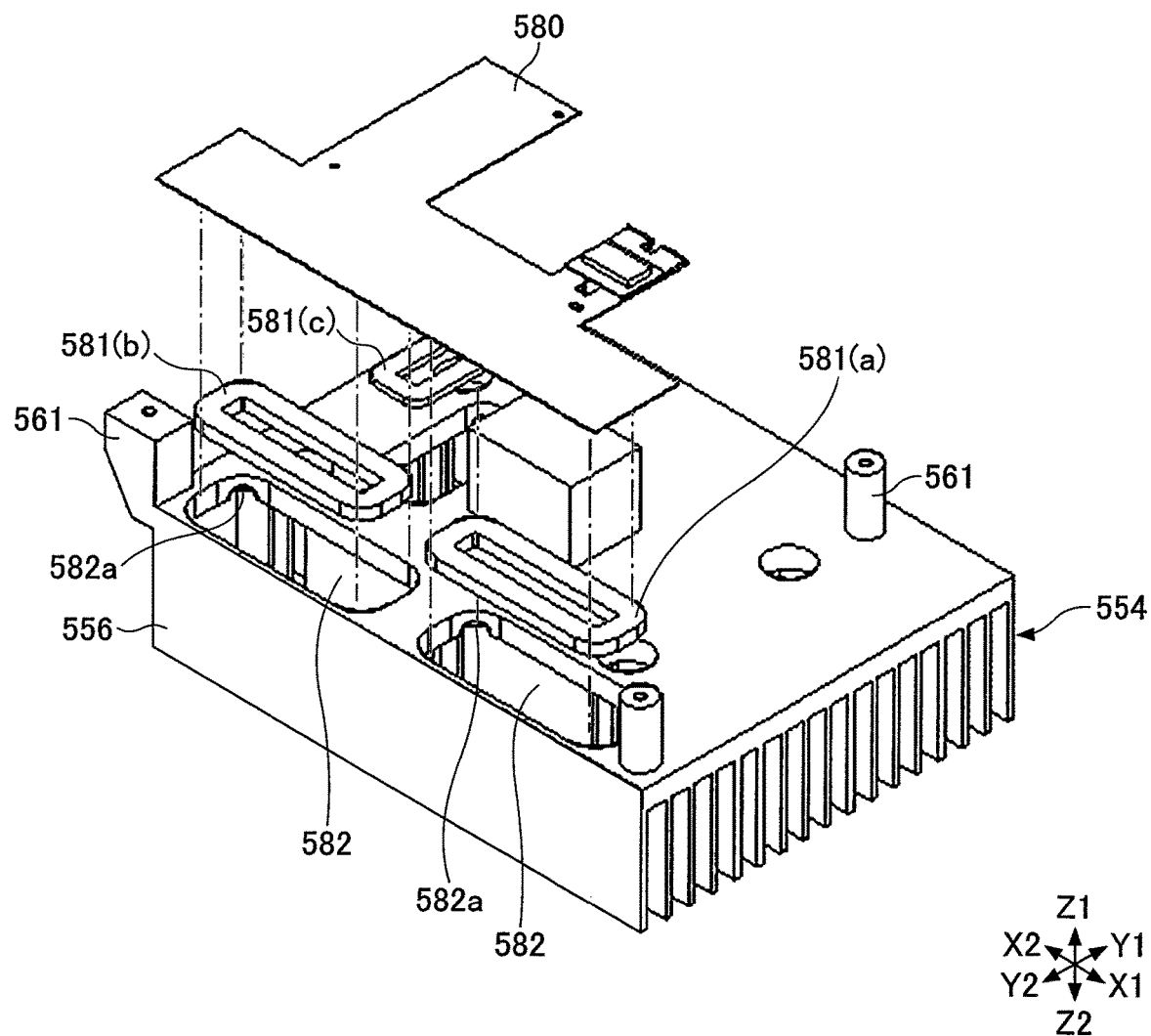

[Fig. 16]
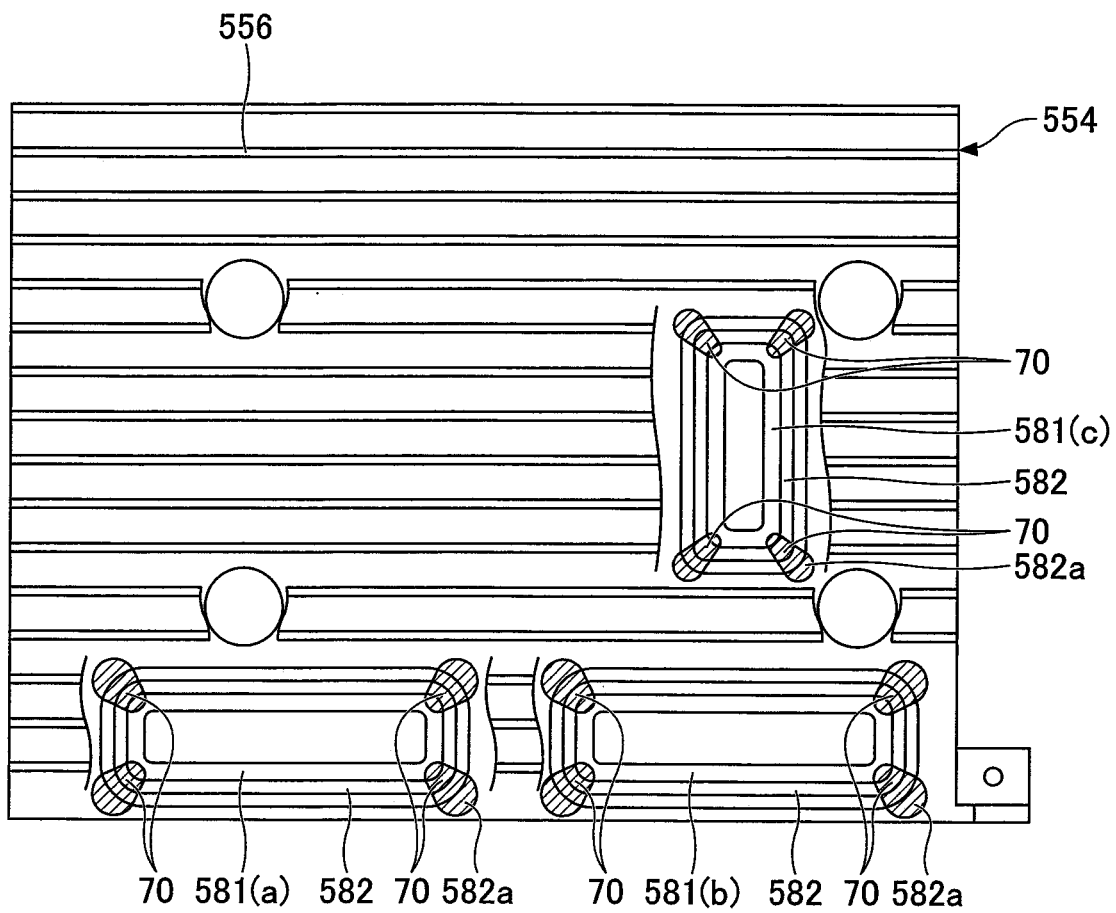

[Fig. 17]
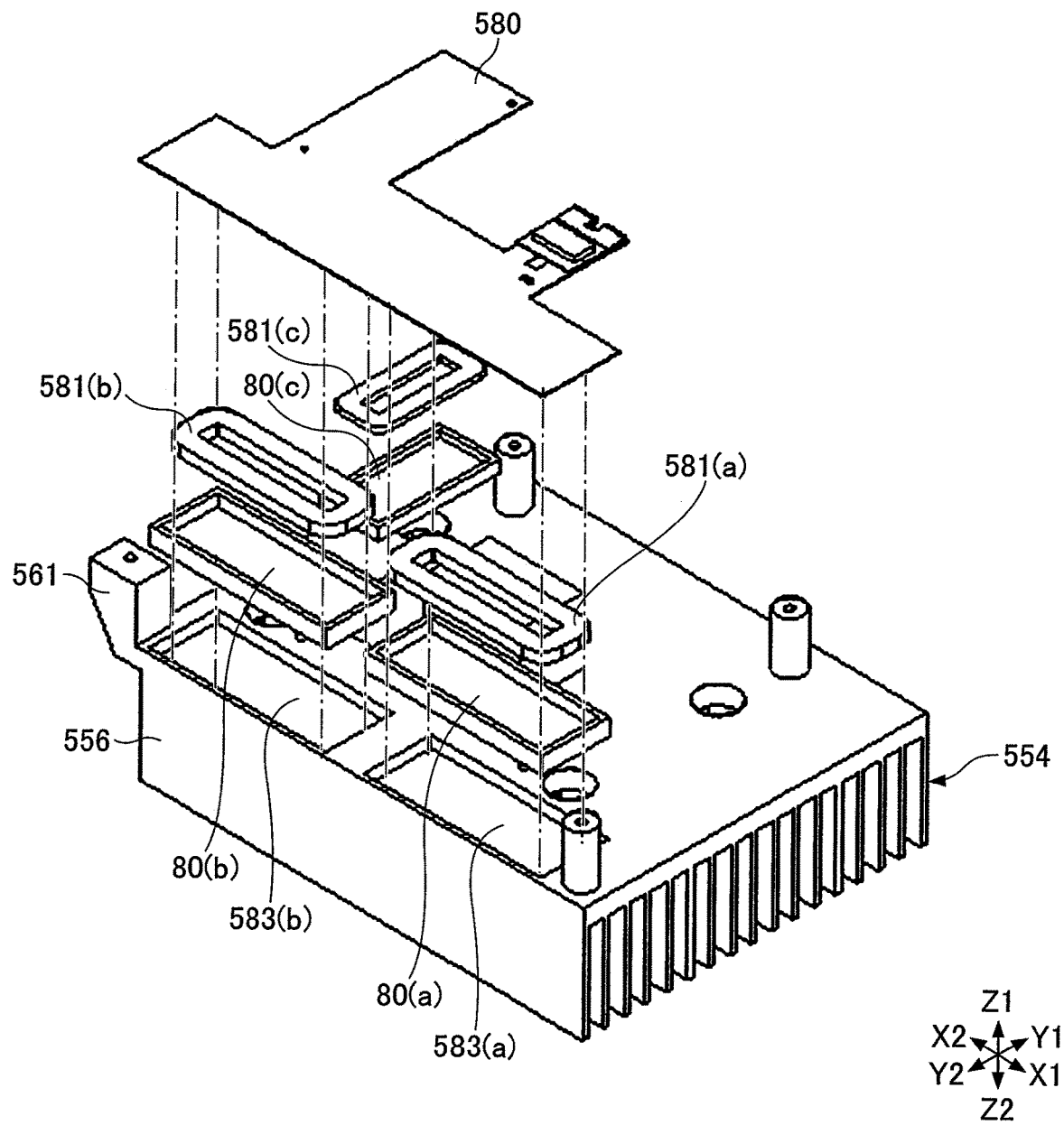

IMAGE GENERATING UNIT, IMAGE PROJECTING APPARATUS, AND HEAT SINK

TECHNICAL FIELD

The present invention relates to an image generating unit, an image projecting apparatus, and a heat sink.

BACKGROUND ART

An image projecting apparatus, which projects, on a screen or the like, an image generated based on image data received from a personal computer (PC) or the like, for example, is known in the related art.

In such an image projecting apparatus, for example, a method is known for shifting optical axes with respect to light beams emitted from a plurality of pixels of a display element to shift the pixels so as to display an image with higher resolution than that of the display element. An image projecting apparatus that includes a fixed unit and a movable unit including a heat sink is known in the related art (for example, see Patent Document 1). A driving configuration for shifting pixels of the image projecting apparatus uses a driving coil supported by the movable unit and a driving magnet supported by the fixed unit to generate driving force.

CITATION LIST

Patent Literature

[PTL 1] Japanese Unexamined Patent Application Publication No. 2016-85368

SUMMARY OF INVENTION

Technical Problem

The present disclosure has an object to provide an image generating unit that can secure a capacity of cooling an image generating part while maintaining stability of driving performance and a size of an apparatus.

Solution to Problem

According to an embodiment of the present disclosure, an image generating unit includes an image generating part configured to generate an image from illumination light; a driving magnet configured to generate a magnetic field; a driving coil arranged in the magnetic field of the driving magnet; a heat radiating part coupled to the image generating part and configured to radiate heat of the image generating part. The driving magnet and the driving coil move the image generating part and the heat radiating part. The driving coil is placed at the heat radiating part via a substance, thermal conductivity of the substance being lower than thermal conductivity of the heat radiating part.

Advantageous Effects of Invention

According to an embodiment of the present disclosure, it is possible to provide an image generating unit that can secure a capacity of cooling an image generating part while maintaining stability of driving performance and a size of an apparatus.

BRIEF DESCRIPTION OF DRAWINGS

FIG. 1 is a perspective view of an example of an image projecting apparatus according to a first embodiment;

FIG. 2 is a block diagram illustrating an example of a configuration of the image projecting apparatus according to the first embodiment;

FIG. 3 is a perspective view of an optical engine according to the first embodiment;

FIG. 4 is a perspective view of an example of a lighting optical system unit according to the first embodiment;

FIG. 5 is a diagram illustrating an example of an internal configuration of a projection optical system unit according to the first embodiment;

FIG. 6 is a perspective view of an image generating unit according to the first embodiment;

FIG. 7 is a side view of the image generating unit according to the first embodiment;

FIG. 8 is an exploded perspective view of a fixed unit according to the first embodiment;

FIG. 9 is a diagram illustrating a structure of supporting a movable plate by the fixed unit according to the first embodiment;

FIG. 10 is an exploded perspective view of a movable unit according to the first embodiment;

FIG. 11 is a side view of the movable unit according to the first embodiment;

FIG. 12 is an exploded perspective view of an example of a configuration including a driving unit according to the first embodiment;

FIG. 13 is an exploded perspective view of an example of a configuration including a position detecting unit according to the first embodiment;

FIG. 14 is an exploded side view of the example of the configuration including the position detecting unit according to the first embodiment;

FIG. 15 is an exploded perspective view of an example of a configuration including a heat sink according to the first embodiment;

FIG. 16 is a bottom view of the heat sink illustrated in FIG. 15; and

FIG. 17 is an exploded perspective view of an example of a configuration including a heat sink according to a second embodiment.

DESCRIPTION OF EMBODIMENTS

In the following, embodiments of the present disclosure will be described with reference to the accompanying drawings. In the drawings, the same numerals are given to the same elements and overlapping descriptions may be omitted as appropriate.

First Embodiment

<Configuration of Image Projecting Apparatus>

FIG. 1 is a perspective view of an example of a projector 1 according to a first embodiment.

The projector 1 is an example of an image projecting apparatus. The projector 1 includes an output window 3 and an external interface (I/F) 9, and an optical engine, which is configured to generate a projection image, is provided inside of the projector 1. For example, when image data is transmitted to the projector 1 from a personal computer (PC) or a digital camera coupled to the external interface 9, the optical engine generates a projection image based on the received image data and projects the image P from the output window 3 onto a screen S as illustrated in FIG. 1.

Note that, in the following drawings, X1-X2 directions represent width directions of the projector 1, Y1-Y2 directions represent depth directions of the projector 1, and Z1-Z2 directions represent height directions of the projector 1. Moreover, in the following description, it is assumed that the output window 3 side of the projector 1 corresponds to the top of the projector 1 and the side of the projector 1 opposite to the output window 3 corresponds to the bottom of the projector 1.

FIG. 2 is a block diagram illustrating an example of a configuration of the projector 1.

As illustrated in FIG. 2, the projector 1 includes a power source 4, a main switch (SW) 5, an operation unit 7, an external interface (I/F) 9, a system control unit 10, a fan 20, and an optical engine 15.

The power source 4 is coupled to a commercial power source, converts voltage and frequency of the commercial power for the internal circuits of the projector 1, and supplies the power to each of the system control unit 10, the fan 20, and the optical engine 15.

The main switch 5 is switched ON or OFF by a user to power on or off the projector 1. While the power source 4 is coupled to the commercial power source via a power cord, if the main switch 5 is switched ON, the power source 4 starts supplying power to the respective components of the projector 1, and if the main switch 5 is switched OFF, the power source 4 stops supplying the power to the respective components of the projector 1.

The operation unit 7 includes buttons configured to receive various input operations by a user. For example, the operation unit 7 is provided on a top surface of the projector 1. The operation unit 7 is configured to receive input operations by the user, such as selection of a size of a projection image, selection of a color tone, and adjustment of a focus. The user's input operation received by the operation unit 7 is sent to the system control unit 10.

The external interface 9 includes connection terminals coupled to, for example, a personal computer (PC) or a digital camera, and is configured to supply (output) image data, which is received from the coupled apparatus, to the system control unit 10.

The system control unit 10 includes an image control unit 11 and a movement control unit 12, which is referred to as the drive control unit 12 hereinafter. For example, the system control unit 10 may include a CPU (a processor), a ROM, and a RAM as hardware components thereof. The functions of the system control unit 10 may be implemented by instructions from the CPU when at least one program read from the ROM into the RAM is executed by the CPU.

The image control unit 11 is configured to control a digital micromirror device (DMD) 551 provided in an image generating unit 50 of the optical engine 15 based on the image data received from the external interface 9, to generate an image to be projected on the screen S.

The drive control unit 12 is configured to control a driving unit that moves a movable unit 55 (which is provided to be movable in the image generating unit 50) and control a position of the DMD 551 provided in the movable unit 55.

The fan 20 is rotated under the control of the system control unit 10 to cool a light source 30 of the optical engine 15.

The optical engine 15 includes the light source 30, a lighting optical system unit 40, the image generating unit 50, and a projection optical system unit 60. The optical engine 15 is controlled by the system control unit 10 to project an image on the screen S as illustrated in FIG. 1.

Examples of the light source 30 include a mercury high-pressure lamp, a xenon lamp, and a light emitting diode (LED). The light source 30 is controlled by the system control unit 10 to emit illumination light to the DMD 551 provided on the image generating unit 50 via the lighting optical system unit 40.

The lighting optical system unit 40 includes, for example, a color wheel, a light tunnel, and relay lenses. The lighting optical system unit 40 is configured to guide the illumination light emitted from the light source 30 to the DMD 551 provided in the image generating unit 50.

The image generating unit 50 includes a fixed unit 51, which is fixed and supported on the image generating unit 50, and the movable unit 55, which is supported to be movable relative to the fixed unit 51. The movable unit 55 includes the DMD 551, and a position of the movable unit 55 relative to the fixed unit 51 is controlled by the drive control unit 12 of the system control unit 10. The DMD 551 is an example of an image generating part. The DMD 551 is controlled by the image control unit 11 of the system control unit 10. The DMD 551 is configured to modulate the illumination light received from the lighting optical system unit 40 and generate a projection image based on the received light.

The projection optical system unit 60 is an example of a projecting part. The projection optical system unit 60 includes, for example, a plurality of projection lenses and mirrors. The projection optical system unit 60 is configured to enlarge the image generated by the DMD 551 of the image generating unit 50, and project the enlarged image on the screen S.

<Configuration of Optical Engine>

Next, a configuration of the optical engine 15 of the projector 1 is explained.

FIG. 3 is a perspective view of an example of the optical engine 15 of the projector 1. As illustrated in FIG. 3, the optical engine 15 includes the light source 30, the lighting optical system unit 40, the image generating unit 50, and the projection optical system unit 60. The optical engine 15 is provided inside of the projector 1.

The light source 30 is provided on a side surface of the lighting optical system unit 40. The light source 30 is configured to emit light in the X2 direction. The lighting optical system unit 40 is configured to guide the light emitted from the light source 30 to the image generating unit 50. The image generating unit 50 is provided beneath the lighting optical system unit 40. The image generating unit 50 is configured to generate a projection image based on the light received from the lighting optical system unit 40. The projection optical system unit 60 is provided above the lighting optical system unit 40. The projection optical system unit 60 is configured to project the projection image generated by the image generating unit 50 onto the screen S, which is provided outside the projector 1.

The optical engine 15 of this embodiment is configured to project the image based on the light emitted from the light source 30 in an upward direction. Alternatively, the optical engine 15 may be configured to project the image in a horizontal direction.

(Lighting Optical System Unit)

FIG. 4 is a diagram illustrating an example of the lighting optical system unit 40 according to the embodiment.

As illustrated in FIG. 4, the lighting optical system unit 40 includes a color wheel 401, a light tunnel 402, relay lenses 403 and 404, a cylinder mirror 405, and a concave mirror 406.

The color wheel 401 is, for example, a disc-like component, in which color filters of R (red), G (green), and B (blue) are provided at different portions in a circumferential direction thereof. The color wheel 401 is rotated at high speed so that the light emitted from the light source 30 is divided into RGB color light beams in a time-division manner.

The light tunnel 402 is, for example, a rectangular tube-like component formed of bonded glass sheets. The light tunnel 402 functions to perform multipath reflection of the RGB color light beams transmitted through the color wheel 401 by the internal surfaces thereof for equalization of luminance distribution, and guides the light beams to the relay lenses 403 and 404.

The relay lenses 403 and 404 function to correct chromatic aberrations on the optical axis of the light beams emitted from the light tunnel 402 and convert the light beams into converging light beams.

The cylinder mirror 405 and the concave mirror 406 function to reflect the light emitted from the relay lenses 403 and 404 to the DMD 551 provided in the image generating unit 50. The DMD 551 is configured to modulate the light reflected from the concave mirror 406 and generate a projection image.

(Projection Optical System Unit)

FIG. 5 is a diagram illustrating an example of an internal configuration of the projection optical system unit 60 according to the embodiment.

As illustrated in FIG. 5, the projection optical system unit 60 includes projection lenses 601, a reflecting mirror 602, and a curved surface mirror 603, which are provided in a housing of the projection optical system unit 60.

The projection lenses 601 include a plurality of lenses. The projection lenses 601 function to focus the projection image generated by the DMD 551 of the image generating unit 50 onto the reflecting mirror 602. The reflecting mirror 602 and the curved surface mirror 603 function to reflect the focused projection image so as to be enlarged, and project the image on the screen S, which is provided outside the projector 1.

(Image Generating Unit)

FIG. 6 is a perspective view of the image generating unit 50 according to the first embodiment. FIG. 7 is a side view of the image generating unit 50 according to the first embodiment.

As illustrated in FIG. 6 and FIG. 7, the image generating unit 50 includes the fixed unit 51 and the movable unit 55. The fixed unit 51 is fixedly supported by the lighting optical system unit 40. The movable unit 55 is movably supported by the fixed unit 51.

The fixed unit 51 includes a top plate 511 as a first fixed plate, and a base plate 512 as a second fixed plate. The top plate 511 and the base plate 512 are held in parallel and face each other via a predetermined gap between the top plate 511 and the base plate 512. The fixed unit 51 is fixed to the bottom of the lighting optical system unit 40 with four screws 520 illustrated in FIG. 6.

The movable unit 55 includes the DMD 551, a movable plate 552, a DMD base plate 553, and a heat radiating part 556. The movable unit 55 is supported by the fixed unit 51 such that that the movable unit 55 is movable. The heat radiating part 556 constitutes a part of the heat sink 554. The heat sink 554 is included in the movable unit 55. Further, according to the first embodiment, the movable plate 552 and the DMD base plate 553 constitute a movable part between the plates. Note that the movable part between the plates may be either the movable plate 552 or the DMD base plate 553.

The DMD 551 is provided on the top surface of the DMD base plate 553. The DMD 551 has an image generation surface, in which a plurality of movable micromirrors are arrayed in a lattice formation. A specular surface of each of the micromirrors of the DMD 551 is provided to be tiltable (slantingly rotatable) around a torsion axis. The ON/OFF drive of each of the micromirrors of the DMD 551 is performed based on an image signal transmitted from the image control unit 11 of the system control unit 10. Here, the DMD 551, which is an example of an image generating part and receives illumination light emitted from the light source 30 to generate an image, is provided on the DMD base plate 553, which is an example of a movable part. The projection optical system unit 60 projects the image generated by the DMD 551.

For example, in an ON state, an inclination angle of the micromirror is controlled so that the micromirror reflects the illumination light from the light source 30 to the projection optical system unit 60. In an OFF state, the inclination angle of the micromirror is controlled so that the micromirror reflects the illumination light from the light source 30 to an OFF light plate (which is not illustrated).

In this manner, in the DMD 551, the inclination angle of each of the micromirrors of the DMD 551 is controlled based on the image signal transmitted from the image control unit 11, and the illumination light emitted from the light source 30 and guided by the lighting optical system unit 40 is modulated and the projection image is generated.

The movable plate 552 is supported between the top plate 511 and the base plate 512 of the fixed unit 51. The movable plate 552 is provided to be movable in a direction parallel to the surface of the movable plate 552.

The DMD base plate 553 is provided between the top plate 511 and the base plate 512. The DMD base plate 553 is coupled to the bottom surface side of the movable plate 552. The DMD 551 is provided on the top surface of the DMD base plate 553. The DMD base plate 553 is displaced (moved) together with the movable plate 552 that is provided to be movable.

The heat sink 554 radiates (dissipates) heat generated in the DMD 551. The heat sink 554 prevents the temperature of the DMD 551 from rising to reduce occurrence of problems such as malfunction and failure, due to the temperature rise of the DMD 551. The heat sink 554 is provided to be movable together with the movable plate 552 and the DMD base plate 553 so that the heat sink 554 can radiate the heat generated at the DMD 551 at all times.

(Fixed Unit 51)

FIG. 8 is an exploded perspective view of the fixed unit 51 according to the embodiment.

As illustrated in FIG. 8 and FIG. 9, the fixed unit 51 includes the top plate 511 and the base plate 512.

For example, the top plate 511 and the base plate 512 are flat-shaped plate members formed of magnetic material such as iron or stainless steel. The top plate 511 and the base plate 512 are supported by a plurality of columnar supports 515 so that the top plate 511 and the base plate 512 are held in parallel via a predetermined gap.

The top plate 511 has a central hole 514 formed on a position facing the DMD 551 of the movable unit 55. Further, the base plate 512 has a heat-transfer hole 519 formed on a position facing the DMD 551. A heat-transfer part of the heat sink 554 is inserted into the heat-transfer hole 519.

An upper end portion of each of the columnar supports 515 is inserted into a corresponding one of support holes 516, which are formed on the top plate 511. A lower end portion of each of the columnar supports 515 is inserted into a corresponding one of support holes 517, which are formed on the base plate 512. The columnar supports 515 support the top plate 511 and the base plate 512 in parallel so as to form the constant distance (gap) between the top plate 511 and the base plate 512.

The top plate 511 has screw holes 518 provided at four locations around the central hole 514. According to the first embodiment, two of the screw holes 518 are formed so as to be in continuous with the central hole 514. The top plate 511 is fixed to the bottom part of the lighting optical system unit 40 with the screws 520 (illustrated in FIG. 6) that are inserted into the respective screw holes 518.

The top plate 511 has a plurality of support holes 526 for rotatably holding support balls 521 that support, from the upper side, the movable plate 552 so that the movable plate 552 is movable. Further, the base plate 512 has a plurality of support holes 522 for rotatably holding support balls 521 that support, from the lower side, the movable plate 552 so that the movable plate 552 is movable.

Upper ends of the respective support holes 526 of the top plate 511 are closed by lid members 527, and the support holes 526 of the top plate 511 hold the support balls 521 rotatably. Cylindrical holding members 523, each of which has an internal thread groove formed on an inner peripheral surface of the holding member 523, are inserted in the support holes 522 of the base plate 512. Lower end parts of the holding members 523 are closed (covered) by the positioning screws 524. The holding members 523 hold the support balls 521 so that the support balls 521 are rotatable.

The support balls 521, which are rotatably held at the top plate 511 and the base plate 512, are respectively in contact with the movable plate 552. Hence, the support balls 521 movably support the movable plate 552 from both surfaces of the movable plate 552.

FIG. 9 is a diagram illustrating a structure of supporting the movable plate 552 by the fixed unit 51 according to the embodiment.

As illustrated in FIG. 9, at the top plate 511, the support balls 521 are rotatably held at the support holes 526 of which the upper end parts are closed by the lid members 527. At the base plate 512, the support balls 521 are rotatably held by the holding members 523, which are inserted in the support holes 522.

Each of the support balls 521 is held so that at least part of the support ball 521 protrudes from the support hole 522 or the support hole 526. Each of the support balls 521 is in contact with the movable plate 552 provided between the top plate 511 and the base plate 512. The top surface and the bottom surface of the movable plate 552 are supported by the plurality of rotatable support balls 521 so that the movable plate 552 is movable in a direction parallel to the top and bottom surfaces of the movable plate 552.

Moreover, the amount of protrusion of the support ball 521 that is provided on the base plate 512 side, from the upper end of the holding member 523 is changed depending on a position of the positioning screw 524. For example, if the positioning screw 524 is displaced in the Z1 direction (upward), the amount of protrusion of the support ball 521 is increased and the distance (gap) between the base plate 512 and the movable plate 552 is increased. On the other hand, if the positioning screw 524 is displaced in the Z2 direction (downward), the amount of protrusion of the support ball 521 is decreased and the gap between the base plate 512 and the movable plate 552 is decreased.

In this way, the gap between the base plate 512 and the movable plate 552 may be appropriately adjusted by changing the amount of protrusion of the support ball 521 by use of the positioning screw 524.

As illustrated in FIG. 8, a plurality of position detecting magnets 541 are provided on the top surface of the base plate 512. Each of the position detecting magnets 541 is constituted with two permanent magnets of rectangular parallelepiped shape and arranged parallel to each other in their longitudinal direction. Each of the position detecting magnets 541 forms a magnetic field, which reaches (affects) the DMD base plate 553 provided between the top plate 511 and the base plate 512.

Hall elements, each of which is provided on the bottom surface of the DMD base plate 553, and the position detecting magnets 541 constitute a position detecting unit that detects a position of the DMD 551.

Further, a plurality of driving magnets (driving-use magnets) 531a, 531b, and 531c are provided on the bottom surface of the base plate 512. Note that the driving magnet 531c is not illustrated in FIG. 8. In the following descriptions, the driving magnets 531a, 531b, and 531c may be referred to as the "driving magnet(s) 531" as appropriate.

Each of the driving magnets 531 is constituted with two magnets of rectangular parallelepiped shape and arranged parallel to each other in their longitudinal direction. Each of the driving magnets 531 forms a magnetic field, which reaches (affects) the heat sink 554. Driving coils 581, provided on the top surface of the heat sink 554, and the driving magnets 531 constitute a driving unit that moves the movable unit 55.

Note that the number, positions, and the like of the support balls 521 and the columnar supports 515, which are provided on the fixed unit 51, are not limited to the configuration described in the first embodiment.

(Movable Unit 55)

FIG. 10 is an exploded perspective view of the movable unit 55 according to the first embodiment. FIG. 11 is a side view of the movable unit 55 according to the first embodiment.

As illustrated in FIG. 10 and FIG. 11, the movable unit 55 includes the DMD 551, the movable plate 552, the DMD base plate 553, and the heat sink 554.

As described above, the movable plate 552 is provided between the top plate 511 and the base plate 512 of the fixed unit 51, and supported by the plurality of support balls 521 to be movable in a direction parallel to the top and bottom surfaces of the movable plate 552.

As illustrated in FIG. 10, the movable plate 552 has a central hole 570 at a position facing the DMD 551, which is mounted on the DMD base plate 553. Further, the movable plate 552 has through holes 572, into which the screws 520, which fix the top plate 511 to the lighting optical system unit 40, are inserted. Further, the movable plate 552 has coupling holes 573, which are used for coupling to the DMD base plate 553, and movable range restriction holes 571 at positions corresponding to the columnar supports 515 of the fixed unit 51.

For example, in a state in which the gap is adjusted by the screws that are inserted into the respective coupling holes 573 such that the surface of the movable plate 552 and the image generation surface of the DMD 551 are parallel, the movable plate 552 and the DMD base plate 553 are coupled and fixed by an adhesive agent to constitute a movable part between plates.

Here, the movable plate 552 moves parallel to the surface, and the DMD 551 moves together with the movable plate 552 as well. Accordingly, if the surface of the movable plate 552 and the image generation surface of the DMD 551 are not parallel, there is a possibility that the image generation surface of the DMD 551 is inclined with respect to the moving direction and the image is disturbed (disordered).

Thus, according to the first embodiment, the screws are inserted into the coupling holes 573 to adjust the gap between the movable plate 552 and the DMD base plate 553, and the surface of the movable plate 552 and the image generation surface of the DMD 551 are held in parallel. Thereby, it is possible to prevent the image quality from decreasing.

The columnar supports 515 of the fixed unit 51 are inserted in the movable range restriction holes 571. For example, if the movable plate 552 is greatly displaced (moved) due to vibration or certain malfunction, the columnar supports 515 come in contact with the movable range restriction holes 571 to restrict the movable range of the movable plate 552.

Note that the number, the positions, and the shapes, and the like of the movable range restriction holes 571 and the coupling holes 573 are not limited to the configuration described in the embodiment. A configuration, which is different from that of the embodiment, may be used to couple the movable plate 552 and the DMD base plate 553.

The DMD base plate 553 is provided between the top plate 511 and the base plate 512 of the fixed unit 51, and coupled to the bottom surface of the movable plate 552 as described above.

The DMD 551 is provided on the top surface of the DMD base plate 553. The DMD 551 is coupled to the DMD base plate 553 via a socket 557. A cover 5580 covers around the DMD 551. The DMD 551 is exposed to the top surface side of the movable plate 552 through the central hole 570 of the movable plate 552. In other words, the DMD 551 may protrude thorough the central hole 570.

The DMD base plate 553 has through holes 555 into which the screws 520, which fix the top plate 511 to the lighting optical system unit 40, are inserted. Further, the DMD base plate 553 has cutouts 558 at portions facing coupling columns 561 of the heat sink 554 so that the movable plate 552 is fixed to the coupling columns 561 of the heat sink 554.

For example, if the movable plate 552 and the DMD base plate 553 are jointly fastened to the coupling columns 561 of the heat sink 554, there is a possibility that the DMD base plate 553 is distorted, the image generation surface of the DMD 551 is inclined with respect to the moving direction, and the image is disturbed. Thus, the cutouts 558 are formed on outer edge portions of the DMD base plate 553 so that the coupling columns 561 of the heat sink 554 are coupled to the movable plate 552 avoiding the DMD base plate 553.

Because the heat sink 554 is coupled to the movable plate 552 according to the above described configuration, the possibility that the DMD base plate 553 is distorted due to receiving a load from the heat sink 554 is reduced. Accordingly, it is possible to maintain the image generation surface of the DMD 551 parallel to the moving direction and to maintain the image quality.

Further, the cutouts 558 of the DMD base plate 553 are formed to include portions facing the support holes 522 of the base plate 512 so that the support balls 521, held by the base plate 512, contact the movable plate 552 while avoiding the DMD base plate 553. According to such a configuration, at the DMD base plate 553, it is possible to prevent occurrence of distortion due to the load from the support balls 521 and to hold the image generation surface of the DMD 551 in parallel to the moving direction to maintain the image quality.

Note that the shapes of the cutouts 558 are not limited to the shapes described in the embodiment. Through holes may be formed on the DMD base plate 553 instead of the cutouts 558 if it is possible to make the DMD base plate 553 be in non-contact with the coupling columns 561 of the heat sink 554 and the support balls 521. In other words, the DMD base plate 553 may have at least one cutout or at least one hole, such that at least one coupling member couples the heat radiating part 556 to the movable plate 552 through the at least one cutout or the at least one hole in a state in which the DMD base plate 553 is not in contact with the at least one coupling member.

As illustrated in FIG. 11, on the bottom surface of the DMD base plate 553, the Hall elements 542 as magnetic sensors are provided at positions facing the position detecting magnets 541 provided on the top surface of the base plate 512. The Hall elements 542, provided at the DMD base plate 553, and the position detecting magnets 541, provided at the base plate 512, constitute a position detecting unit that detects a position of the DMD 551.

As illustrated in FIG. 10 and FIG. 11, the heat sink 554 includes a heat radiating part 556, the coupling columns 561, and a heat-transfer part 563 (see FIG. 11).

The heat radiating part 556 is coupled to the DMD base plate 553. The base plate 512 is provided (interposed) between the heat radiating part 556 and the DMD base plate 553. A plurality of fins are formed on the lower portion of the heat radiating part 556. The heat radiating part 556 radiates (dissipates) heat generated in the DMD 551. As illustrated in FIG. 10, opening parts 582 are formed on the top surface of the heat radiating part 556. Driving coils 581a, 581b, and 581c, which are provided on a flexible base plate 580, are arranged at the opening parts 582. In the following description, the driving coils 581a, 581b, and 581c may be referred to as the "driving coil(s) 581" as appropriate.

The opening parts 582 are formed on positions facing the driving magnets 531 that are provided on the bottom surface of the base plate 512. Note that the first embodiment has a configuration in which the driving coils 581 are arranged in the opening parts 582 and are not directly in contact with the heat radiating part 556. In other words, the heat sink 554 has the opening parts 582 such that the driving coils 581 are able to be arranged in the opening parts 582. This specific configuration will be described later below.

The driving coils 581, which are arranged in the opening parts 582, and the driving magnets 531, which are provided on the bottom surface of the base plate 512, constitute a driving unit that moves the movable unit 55 relative to the fixed unit 51. Note that each of the driving coils 581 is arranged in a magnetic field generated by the corresponding driving magnet 531.

Further, the heat radiating part 556 has through holes 562, into which the screws 520, which fix the top plate 511 to the lighting optical system unit 40, are inserted.

The coupling columns 561 are formed on three locations to extend from the top surface of the heat radiating part 556 in the Z1 direction. The movable plate 552 is fixed to respective upper ends of the coupling columns 561 with screws 564 (illustrated in FIG. 11). The coupling columns 561 are coupled to the movable plate 552 without contacting the DMD base plate 553 because of the cutouts 558 formed on the DMD base plate 553.

As illustrated in FIG. 11, the heat-transfer part 563 extends from the top surface of the heat radiating part 556 in the Z1 direction and is in contact with the bottom surface of the DMD 551 to transfer, to the heat radiating part 556, heat generated at the DMD 551. For example, a heat-transfer sheet may be provided between the DMD 551 and the upper end surface of the heat-transfer part 563 in order to enhance heat conductivity. In such a case, the thermal conductivity between the heat-transfer part 563 of the heat sink 554 and the DMD 551 is enhanced by the heat-transfer sheet, and thereby the effect of cooling the DMD 551 is enhanced. Because the driving coils 581 are not directly in contact with the heat sink 554, it is possible to prevent cooling effects for the DMD 551 from being decreased by heat of the driving coils 581 being transferred to the heat sink 554. Details of this will be described later below.

The through holes 572 of the movable plate 552, the through holes 555 of the DMD base plate 553, and the through holes 562 of the heat sink 554 are formed to face each other in the Z1-Z2 direction. The screws 520, which fix the top plate 511 to the lighting optical system unit 40, are inserted into the through holes 562, the through holes 555, and the through holes 572, from the lower side. In other words, the through holes 562, the through holes 555, and the through holes 572 may be respectively overlapped in the Z1-Z2 direction.

Here, a space corresponding to the thickness of the DMD 551 and the socket 557 is created from the surface of the DMD base plate 553 to the image generation surface of the DMD 551. If the DMD base plate 553 is arranged above the top plate 511, the space from the surface of the DMD base plate 553 to the image generation surface of the DMD 551 becomes a dead space and there is a possibility that the apparatus configuration grows in size.

According to the embodiment, the DMD base plate 553 is provided between the top plate 511 and the base plate 512 to arrange the top plate 511 in the space from the surface of the DMD base plate 553 to the image generation surface of the DMD 551. According to such a configuration, it is possible to effectively utilize the space from the surface of the DMD base plate 553 to the image generation surface of the DMD 551 to reduce the height in the Z1-Z2 direction and to reduce the size of the apparatus configuration. Thus, the image generating unit 50 according to the embodiment can be installed not only in a large projector but also in a small projector. That is, the versatility of the image generating unit 50 according to the embodiment can be enhanced.

(Driving Unit)

FIG. 12 is an exploded perspective view of an example of the driving unit according to the first embodiment.

The driving unit according to the embodiment includes the driving magnets 531, provided on the base plate 512, and the driving coils 581, provided on the heat sink 554.

Each of the driving magnets 531a and 531b is constituted with two permanent magnets of which the longitudinal directions are parallel with the X1-X2 direction. The driving magnet 531c is constituted with two permanent magnets of which the longitudinal directions are parallel with the Y1-Y2 direction. Each of the driving magnets 531 forms a magnetic field, which reaches (affects) the heat sink 554.

Each of the driving coils 581 is formed of electric wire wound around an axis parallel to the Z1-Z2 direction. The respective driving coils 581 are arranged within the opening parts 582 formed on the top surface of the heat radiating part 556 of the heat sink 554, without being in contact with the heat sink 554. Details of this will be described later below.

In the state in which the movable unit 55 is supported by the fixed unit 51, the driving magnets 531 of the base plate 512 and the driving coils 581 of the heat sink 554 are provided to face each other, respectively. When electric current is caused to flow through the driving coils 581, a Lorentz force that becomes a driving force moving the movable unit 55 is generated by the magnetic fields formed by the driving magnets 531.

Receiving the Lorentz force as the driving force generated between the driving magnets 531 and the driving coils 581, the movable unit 55 is displaced to linearly move or rotate in the X-Y plane relative to the fixed unit 51.

According to the embodiment, as a first driving unit, the driving coil 581a and the driving magnet 531a, and the driving coil 581b and the driving magnet 531b are provided to face each other along the X1-X2 direction. When electric current flows through the driving coils 581a and 581b, the Lorentz force is generated in the Y1 direction or the Y2 direction.

The movable unit 55 is moved in the Y1 direction or the Y2 direction by Lorentz forces generated at the driving coils 581a and 581b. The movable unit 55 is rotated in the XY plane, by Lorentz forces generated at the driving coils 581a and 581b in opposite directions.

For example, when electric current is supplied so that a Lorentz force in the Y1 direction is generated at the driving coil 581a and a Lorentz force in the Y2 direction is generated at the driving coil 581b, the movable unit 55 rotates counterclockwise in a top view. On the other hand, when electric current is supplied so that a Lorentz force in the Y2 direction is generated at the driving coil 581a and a Lorentz force in the Y1 direction is generated at the driving coil 581b, the movable unit 55 rotates clockwise in a top view.

Further, according to the embodiment, the driving coil 581c and the driving magnet 531c are provided as a second driving unit. The driving magnet 531c is arranged so that the longitudinal direction of the driving magnet 531c is orthogonal to the longitudinal direction of the driving magnets 531a and 531b. In such a configuration, when electric current flows through the driving coil 581c, Lorentz force in the X1 direction or the X2 direction is generated. The movable unit 55 is moved in the X1 direction or the X2 direction by the Lorentz force generated at the driving coil 581c.

The magnitude and direction of an electric current flowing through each of the driving coils 581 are controlled by the drive control unit 12 of the system control unit 10. The drive control unit 12 controls (changes) the magnitude and direction of the electric current to be supplied to each of the driving coils 581 to control the direction of movement (or rotation), the amount of movement, and the rotational angle of the movable plate 552.

The base plate 512 has a heat-transfer hole 559 provided on a position facing the DMD 551 provided on the DMD base plate 553. The heat-transfer part 563 of the heat sink 554 is inserted into the heat-transfer hole 559. Further, the base plate 512 has through holes 560, into which the screws 520, which fix the top plate 511 to the lighting optical system unit 40, are inserted.

Here, in the movable unit 55 according to the embodiment, a weight of the heat sink 554 is heavier than a weight including the DMD base plate 553 and the movable plate 552. Thus, a position of a center of gravity of the movable unit 55 in the Z1-Z2 direction is located close to the heat radiating part 556 of the heat sink 554.

In such a configuration, for example, when the driving coils 581 are provided on the movable plate 552 to cause a Lorentz force as a driving force to act on the movable plate 552, the position of the center of gravity of the movable unit 55 and a driving force generation surface, at which the driving coils 581 are located, are away from each other in the Z1-Z2 direction. Similarly, when the driving coils 581 are provided on the DMD base plate 553, the position of the center of gravity of the movable unit 55 and the driving force generation surface, at which the driving coils 581 are located, are away from each other in the Z1-Z2 direction.

In such a configuration in which the center of gravity of the movable unit 55 is away from the driving force generation surface, there is a possibility that the movable unit 55 swings (oscillates) like a pendulum where the position of the center of gravity in the Z1-Z2 direction is a support point and the driving force generation surface is a point of action. Because the acting moment increases as a distance between the support point and the point of action increases, vibration increases as the amount of deviation between the position of the center of gravity of the movable unit 55 and the driving force generation surface increases in the Z1-Z2 direction, and it becomes difficult to control the position of the DMD 551.

Further, when the movable unit 55 swings like a pendulum, loads on the movable plate 552, and on the top plate 511 and the base plate 512, which support the movable plate 552, are increased, and there is a possibility that each plate gets distorted or broken and the image is disturbed.

Thus, according to the embodiment, the driving coils 581 are arranged in the opening parts 582 of the heat sink 554 so that the driving force generation surface is located at the heat radiating part 556 of the heat sink 554 as illustrated in FIG. 11. According to such a configuration, a distance (gap) between the center of gravity of the movable unit 55 and the driving force generation surface in the Z1-Z2 direction is decreased to the extent possible.

Therefore, the movable unit 55 according to the embodiment does not swing like a pendulum, and the moving direction(s) of the entire unit is held in the direction(s) parallel with the X-Y plane. Thus, without occurrence of problems such as distortion and breakage of each plate as described above, it becomes possible to enhance the operating stability of the movable unit 55 and to control the position of the DMD 551 with high accuracy. According to an embodiment, similar effects can be obtained when the driving magnets 531a, 531b, and 531c are provided on the base plate 512 side of the heat sink 554 and the driving coils 581a, 581b, and 581c are provided on the heat sink 554 side of the base plate 512. In other words, the driving coils 581 may be provided on the bottom surface of the base plate 512 and the driving magnets 531 may be provided in the opening parts 582 of the heat sink 554. It should be noted that according to such an embodiment, at least one driving coil 581 may be provided on one of the base plate (fixed member) 512 and the heat radiating part 556, and at least one driving magnet 531 may be provided on the other of the base plate 512 and the heat radiating part 556.

It is preferable that the position of the center of gravity of the movable unit 55 matches the driving force generation surface in the Z1-Z2 direction. For example, a depth (size) of the opening parts 582 to which the driving coils 581 are attached, a shape of the heat radiating part 556 of the heat sink 554, and/or the like may be appropriately changed to match the position of the center of gravity of the movable unit 55 and the driving force generation surface in the Z1-Z2 direction.

(Position Detecting Unit)

FIG. 13 is an exploded perspective view of an example of a configuration including the position detecting unit according to the first embodiment. FIG. 14 is an exploded side view of the example of the configuration including the position detecting unit according to the first embodiment.

The position detecting unit according to the embodiment includes the position detecting magnets 541, provided on the base plate 512, and the Hall elements 542, provided on the DMD base plate 553. The position detecting magnets 541 and the Hall elements 542 are arranged to face each other in the Z1-Z2 direction. In other words, at least one position detecting magnet 541 and at least one Hall element 541 may be arranged between the DMD base plate 553 and the base plate 512 or the top plate 511 to face each other.

Each of the Hall elements 542 is an example of a magnetic sensor. The Hall element 542 transmits, to the drive control unit 12 of the system control unit 10, a signal in accordance with a change of a magnetic flux density from the position detecting magnet 541 that is provided to face the Hall element 541. The drive control unit 12 detects, based on the signals transmitted from the Hall elements 542, the position of the DMD 551 provided on the DMD base plate 553 from the position of the Hall elements 542.

Here, according to the embodiment, the base plate 512 and the top plate 511 formed with magnetic material serve as yoke boards and constitute a magnetic circuit, which includes the position detecting magnets 541. Further, the magnetic flux generated at the driving unit, which is provided between the base plate 512 and the heat sink 554 and includes the driving magnets 531 and the driving coils 581, is concentrated in the base plate 512, which functions as a yoke board, and thus, the leakage to the position detecting unit is reduced.

Accordingly, the effect of the magnetic fields generated by the driving unit including the driving magnets 531 and the driving coils 581 is reduced at the Hall elements 542 provided on the bottom surface side of the DMD base plate 553. Therefore, the Hall elements 542 can output signals in accordance with the change of the magnetic flux density of the position detection magnets 541 without being affected by the magnetic fields generated at the driving unit. Thus, it is possible for the drive control unit 12 to detect (determine) the position of the DMD 551 with high accuracy.

In this way, the drive control unit 12 can detect the position of the DMD 551 with high accuracy based on the output of the Hall elements 542, in which effect from the driving unit is reduced. Accordingly, the drive control unit 12 can control the magnitude and the direction of the electric current flowing through the driving coils 581 in accordance with the detected position of the DMD 551 and can control the position of the DMD 551 with high accuracy.

It should be noted that the configuration of the driving unit and the configuration of the position detecting unit are not limited to the configurations described in the embodiment. The number, positions, etc., of the driving magnets 531 and the driving coils 581 as the driving unit may be different from those described in the embodiment as long as the movable unit 55 can be moved to a suitable position. For example, the driving unit, which moves the movable unit 55 relative to the fixed unit 51, may include at least one driving magnet and at least one driving coil, which faces the at least one driving magnet. The at least one driving magnet and the at least one driving coil may be arranged between the base plate 512 and the heat radiating part 556. Further, the number, positions, etc., of the position detecting magnets 541 and the Hall elements 542 as the position detecting unit may be different from those described in the embodiment as long as it is possible to detect the position of the DMD 551.

For example, the position detecting magnets 541 may be disposed on the top plate 511 and the Hall elements 542 may be disposed on the movable plate 552. Further, for example, the position detecting unit may be disposed between the base plate 512 and the heat sink 554, and the driving unit may be disposed between the top plate 511 and the base plate 512.

However, it is preferable to provide a yoke board between the driving unit and the position detecting unit in order to reduce the effect of the magnetic fields from the driving unit to the position detecting unit. Further, it is preferable to provide the driving magnets 531 and the position detecting magnets 541 on the top plate 511 or the base plate 512 of the fixed unit 51, because, otherwise, there is a possibility that the weight of the movable unit 55 increases and it becomes difficult to control the position of the movable unit 55.

Further, the top plate 511 and the base plate 512 may be partially made of magnetic material as long as it is possible to reduce the leakage of the magnetic flux from the driving unit to the position detecting unit. For example, the top plate 511 and the base plate 512 may be formed by stacking multiple members including a flat-plate-shaped member or a sheet-shaped member made of magnetic material. The top plate 511 may be made of non-magnetic material as long as the base plate 512 is at least partially made of magnetic material and functions as a yoke board for preventing the leakage of the magnetic flux from the driving unit to the position detecting unit.

Here, in order to stabilize driving performance in shifting an image, it is preferable that a position of the center of gravity of a movable unit matches a driving force generation surface. In the image projecting apparatus disclosed in Patent Document 1, although the position of the center of gravity of the movable unit is at the heat sink, the driving coil is arranged at a movable plate of the movable unit. Thus, there may be a case in which the position of the center of gravity of the movable unit is away from the driving force generation surface at which the driving coil is located and the driving performance is unstable.

Although a configuration might be considered in which a driving coil is arranged inside a heat sink such that a position of the center of gravity matches a driving force generation surface, the configuration has the following problem.

That is, an intended purpose of a heat sink is to cool a digital micromirror device (DMD) provided on a movable unit. However, when the driving coil is arranged inside the heat sink, cooling of the DMD is degraded by high heat of the driving coil directly transferred to the heat sink. As a coping technique, it might be considered to decrease an electric current caused to flow through the driving coil to reduce the heat generation amount. However, this leads to growth in size of the entire apparatus because the driving coil and the driving magnet are required to be large.

<Heat Sink>

FIG. 15 is an exploded perspective view of an example of a configuration including the heat sink 554 according to the first embodiment. FIG. 16 is a bottom view of FIG. 15. The first embodiment is characterized by an arrangement (positional relationship) between the heat sink 554 and the driving coils 581. In a configuration of the related art, recessed portions having bottoms are provided on the top surface of a heat sink for housing driving coils. Thus, the heat sink receives high heat of the driving coils via the recessed portions, and thereby cooling effects for a DMD, which are an intended purpose, are decreased.

For the heat sink 554 made of metal according to the first embodiment, the opening parts 582 are provided on the top surface of the heat radiating part 556 as described above. Each of the opening parts 582 has a shape sufficiently larger than an outer diameter (size) of the driving coils 581. The driving coils 581 are placed in the opening parts 582 via low thermal conductive materials 70 without being in contact with the heat sink 554. Stainless steel or copper can be used for the heat transfer part 563, the heat radiating part 556, and the coupling columns 561 of the heat sink 554. The heat radiating part 556 has a plurality of fins formed of metal such as stainless steel or copper on one surface of a thick rectangular plate formed of metal such as stainless steel or copper. The driving coils 581 are arranged at the surface of the heat radiating part 556 opposite to the surface on which the plurality of fins are provided.

Each of the low thermal conductive materials 70 is a substance whose thermal conductivity is lower than the thermal conductivity of the heat radiating part 556. For example, each of the low thermal conductive materials 70 is an adhesive agent made from ultraviolet curable epoxy resin. More specifically, for example, "TB3114" manufactured by Three Bond Co., Ltd. can be used. The thermal conductivity of epoxy resin is 0.30 W/(m·K). Therefore, various kinds of adhesive agents made from resin can be used other than TB3114. Note that the low thermal conductive materials 70 may be resin members, foam members, or fiber members. Foam rubber may be used as such a foam member. Specifically, chloroprene rubber or ethylene propylene rubber can be used as such a foamed rubber. The thermal conductivity of chloroprene rubber is 0.25 W/(m·K). The thermal conductivity of ethylene propylene rubber is 0.36 W/(m·K). Thus, when the thermal conductivity of the low thermal conductive materials 70 is less than or equal to 0.36 W/(m·K), the low thermal conductive materials 70 have effects of achieving an object with near certainty. However, the low thermal conductive materials 70 are not limited to materials whose thermal conductivity is less than or equal to 0.36 W/(m·K), but may be selected depending on a temperature of the driving coils 581 or an amount of heat generated by the driving coils 581. For example, a molded product obtained by mixing thermosetting resin with rock wool or a molded product obtained by mixing thermosetting resin with a glass fiber can be used as a fiber member.

Each of the driving coils 581 is arranged in the corresponding opening part 582 through the low thermal conductive materials 70 that are arranged at at least three locations. Note that in the example of FIG. 16, receiving parts 582a are provided on the four corners of the outer edge part of the opening parts 582 for receiving and storing the low thermal conductive materials 70.

Therefore, the low thermal conductive materials 70 are arranged, between the respective corner parts of the driving coils 581 and the receiving parts 582a arranged at the four corners of the opening parts 582, such that the driving coils 581 are arranged (bonded) in the opening parts 582. Note that the driving coils 581 are arranged so as not to be directly in contact with the opening parts 582. Further, the opening parts 582 and the driving coils 581 are arranged at positions facing the driving magnets 531 arranged on the base plate 512.

Although the heat radiating part 556 is also present at positions directly below the opening parts 582, for the convenience of description, it is omitted, by the broken lines, in the illustrated example. Of course, the heat radiating part 556 may be employed in a shape of avoiding positions directly below the opening parts 582. In this case, the driving coils 581 can be mounted into the opening parts 582 from the lower side of the heat sink 554 (from the arrow Z2 side).

As described above, the first embodiment has a configuration in which the driving coils 581 are placed, without being in contact with the opening parts 582, inside the opening parts 582 via the low thermal conductive materials 70 whose thermal conductivity is lower than that of the heat radiating part 556. In other words, in a state in which the driving coils 581 are not in contact with the heat radiating part 556, the driving coils 581 are bonded to the low thermal conductive materials 70 and the low thermal conductive materials 70 are bonded to the heat radiating part 556.

Therefore, it is possible to prevent high heat of the driving coils 581 from being transferred to the heat radiating part 556 and the heat sink 554 and to secure an effect of cooling the DMD 551, which is to be essentially exerted by the heat radiating part 556 and the heat sink 554. Further, according to the above described configuration, performance of cooling the DMD can be secured without changing a size of the driving coils 581 and the driving magnets 531. Therefore, it is possible to maintain a size of the entire apparatus.

Furthermore, because the first embodiment has a configuration in which the driving coils 581 are arranged inside the heat radiating part 556, the position of the center of gravity of the movable unit 55 is close to the driving force generation surface, at which the driving coils 581 are located, and it is possible to secure stable driving performance.

Second Embodiment

Next, a second embodiment will be described. The second embodiment has a technical idea substantially similar to that of the first embodiment. Therefore, differences between the first and second embodiments will be mainly described and overlapping descriptions may be omitted as appropriate. FIG. 17 is an exploded perspective view of an example of a configuration including a heat sink according to the second embodiment.

The second embodiment is different from the first embodiment in that low thermal conductive materials 80 are casing members that can house (accommodate) the driving coils 581. It is preferable that the low thermal conductive materials 80 are made of a resin. Thermal conductivity of the low thermal conductive materials 80 is lower than the thermal conductivity of the heat radiating part 556. Each of the low thermal conductive materials 80 has a box shape having an opening at the top surface. The opening of each of the box-shaped low thermal conductive materials 80 is larger than the corresponding driving coil 581 so as to be able to house the corresponding driving coil 581.

Further, the second embodiment is different from the first embodiment in that recessed parts 583 each of which has a bottom are provided on the top surface of the heat radiating part 556 of the heat sink 554. Each of the recessed parts 583 has a shape of being able to house the corresponding low thermal conductive material 80.

The low thermal conductive materials 80 housing the driving coils 581 are housed in the recessed parts 583 provided at the heat radiating part 556. That is, the driving coils 581 according to the second embodiment are arranged inside the heat sink 554 via the low thermal conductive materials 80 without being in contact with the heat sink 554.

Therefore, it is possible to minimize transfer of high heat of the driving coils 581 to the heat radiating part 556 and the heat sink 554 and to secure an effect of cooling the DMD 551, which is to be essentially exerted by the heat radiating part 556 and the heat sink 554.

Note that although the number of low thermal conductive materials 80 prepared corresponds to the number of plurality of recessed parts 583 arranged on the top surface of the heat radiating part 556 in the example illustrated in FIG. 17, the present disclosure is not limited to this. A plurality of low thermal conductive materials 80 may be integrally coupled by a coupling part or the like. In such a case, after being arranged in the recessed parts 583, the low thermal conductive materials 80 may be fixed to a coupling part by screws such that the low thermal conductive materials 80 can be easily fixed to the heat radiating part 556.

The image generating unit and the image projecting apparatus according to the present disclosure are not limited to the above described embodiments, but various variations and modifications may be made without departing from the scope of the present disclosure.

The present application is based on and claims the benefit of priority of Japanese Priority Application No. 2016-220532 filed on Nov. 11, 2016, and Japanese Priority Application No. 2017-143044 filed on Jul. 24, 2017, with the Japanese Patent Office, the entire contents of which are hereby incorporated by reference.

REFERENCE SIGNS LIST 1 projector (image projecting apparatus)
10 system control unit
1 image control unit
1 drive control unit
30 light source
40 lighting optical system unit
50 image generating unit
51 fixed unit
55 movable unit
60 projection optical system unit (projecting part)
511 top plate (first fixed plate)
512 base plate (second fixed plate)
531 driving magnet
541 position detecting magnet
581 driving coil (coil)
582 opening part
582a receiving part
583 recessed part
542 Hall element
551 DMD (image generating part)
552 movable plate (movable part)
553 DMD base plate (movable part)
554 heat sink
556 heat radiating part
563 heat transfer part
70, 80 low thermal conductive material

The invention claimed is:

1. An image generating unit comprising:
an image generating part configured to generate an image from illumination light;
a driving magnet configured to generate a magnetic field;
a driving coil arranged in the magnetic field of the driving magnet;
a heat radiating part coupled to the image generating part and configured to radiate heat of the image generating part,
wherein the driving magnet and the driving coil move the image generating part and the heat radiating part, and
wherein the driving coil is placed at the heat radiating part via a substance, thermal conductivity of the substance being lower than the thermal conductivity of the heat radiating part,
wherein the heat radiating part is formed of a metal material, and
wherein the thermal conductivity of the substance is less than or equal to 0.36 W/(m·K).

2. The image generating unit according to claim 1, further comprising:
a first fixed plate;
a second fixed plate;

a movable part movably supported between the first fixed plate and the second fixed plate, wherein the image generating part and the heat radiating part are coupled to the movable part, and wherein the second fixed plate is arranged between the movable part and the heat radiating part, and the driving magnet is placed at a surface facing the heat radiating part and at a position facing the driving coil.

3. The image generating unit according to claim 1, wherein the heat radiating part is metal, and wherein the substance, whose thermal conductivity is lower than the thermal conductivity of the heat radiating part, is a resin member, a foam member, or a fiber member.

4. The image generating unit according to claim 1, wherein the heat radiating part has an opening part in which the driving coil is able to be arranged, wherein the substance, whose thermal conductivity is lower than the thermal conductivity of the heat radiating part, is an adhesive agent made from ultraviolet curable epoxy resin, wherein the driving coil is arranged and bonded by the substance, whose thermal conductivity is lower than the thermal conductivity of the heat radiating part, in the opening part.

5. The image generating unit according to claim 1, wherein the substance, whose thermal conductivity is lower than the thermal conductivity of the heat radiating part, is a casing member for housing the driving coil, and wherein the substance, whose thermal conductivity is lower than the thermal conductivity of the heat radiating part housing the driving coil, is housed in a recessed part provided at the heat radiating part.

6. An image projecting apparatus comprising:

the image generating unit according to claim 1;

a light source configured to emit the illumination light to the image generating part; and a projecting part configured to project the image generated by the image generating part.

7. The image generating unit according to claim 1, wherein in a state in which the driving coil is not in contact with the heat radiating part, the driving coil is bonded to the substance and the substance is bonded to the heat radiating part.

8. A heat sink comprising:

a driving magnet configured to generate a magnetic field;

a heat radiating part; and a coil arranged in the magnetic field of the driving magnet and placed at the heat radiating part via a substance, thermal conductivity of the substance being lower than the thermal conductivity of the heat radiating part, wherein the driving magnet and the coil move the heat radiating part, wherein the heat radiating part is formed of a metal material, and wherein the thermal conductivity of the substance is less than or equal to 0.36 W/(m·K).

9. The heat sink according to claim 8, wherein the substance, whose thermal conductivity is lower than the thermal conductivity of the heat radiating part, is made of at least one of a resin member, a foam member, or a fiber member.

* * * * *